United States Patent [19]

Taniguchi et al.

[11] Patent Number: 4,733,263
[45] Date of Patent: Mar. 22, 1988

[54] PHOTOGRAPHIC CAMERA

[75] Inventors: Nobuyuki Taniguchi, Nishinomiya; Takeo Hoda, Kawachinagano; Yoshiaki Hata, Nishinomiya; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 932,149

[22] Filed: Nov. 18, 1986

[30] Foreign Application Priority Data

Nov. 20, 1985 [JP] Japan ................... 60-258735
Nov. 20, 1985 [JP] Japan ................... 60-258736
Dec. 11, 1985 [JP] Japan ................... 60-276920

[51] Int. Cl.$^4$ .................. G03B 15/03; G03B 17/24
[52] U.S. Cl. .................. 354/419; 354/149.11; 354/105
[58] Field of Search ............... 354/412, 413, 419, 105, 354/106, 126, 145.1, 149.11, 159, 195.1

[56] References Cited

U.S. PATENT DOCUMENTS 3,490,844 1/1970 Sapp, Jr. .................. 354/106
4,583,831 4/1986 Harvey .................. 354/106

FOREIGN PATENT DOCUMENTS 54-26721   2/1979 Japan .
55-129321 10/1980 Japan .
58-20021   4/1983 Japan .
58-152227  9/1983 Japan .
60-145428  9/1985 Japan .

Primary Examiner—W. B. Perkey
Attorney, Agent, or Firm—Burns, Doane, Swecker & Mathis

[57] ABSTRACT

A camera having, in addition to a real focal length photographing mode, a pseudo focal length photographing mode, namely, a photographing mode in which a part of a photographed image frame of a film is printed at an enlarging ratio different from an ordinary enlarging ratio to obtain a print as if it had been photographed using a telephoto lens. It is provided with means for recording photographing mode information on a frame of a film when the pseudo focal length photographing mode is selected, and a control means which brings a flash light emitting device into an operable condition in response to the selection of the pseudo focal length photographing mode and which actuates the flash light emitting device in synchronism with release of the shutter. An optical axis of a photographing lens and a flash emission tube are spaced from each other, and the pseudo focal length photographing mode can be selected only when a negative film is loaded in the camera.

4 Claims, 29 Drawing Figures

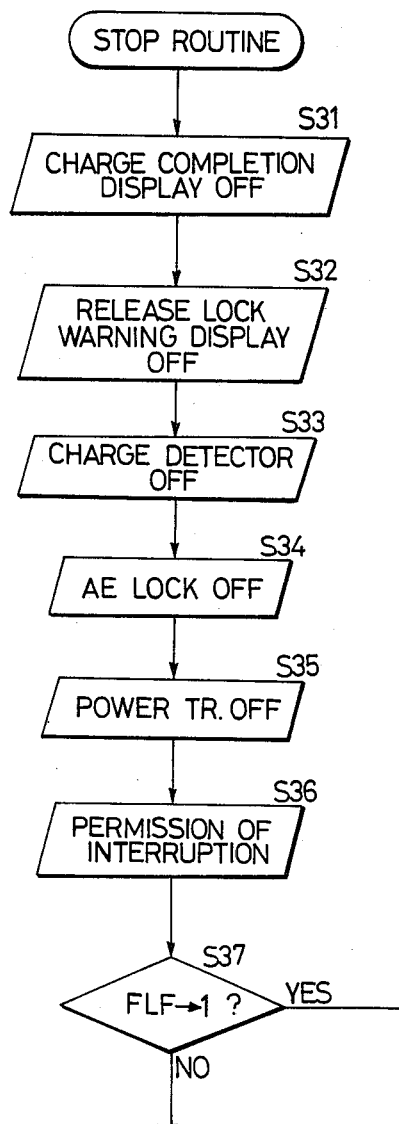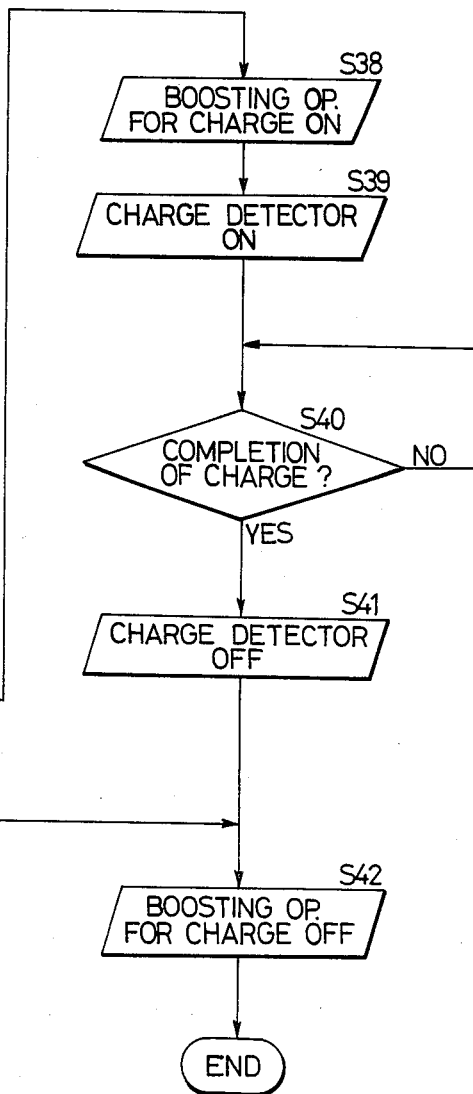
FIG.5

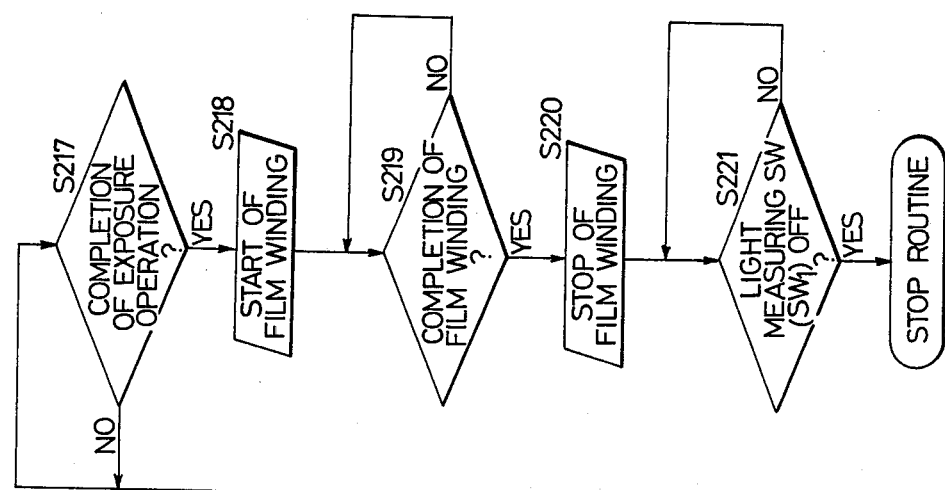
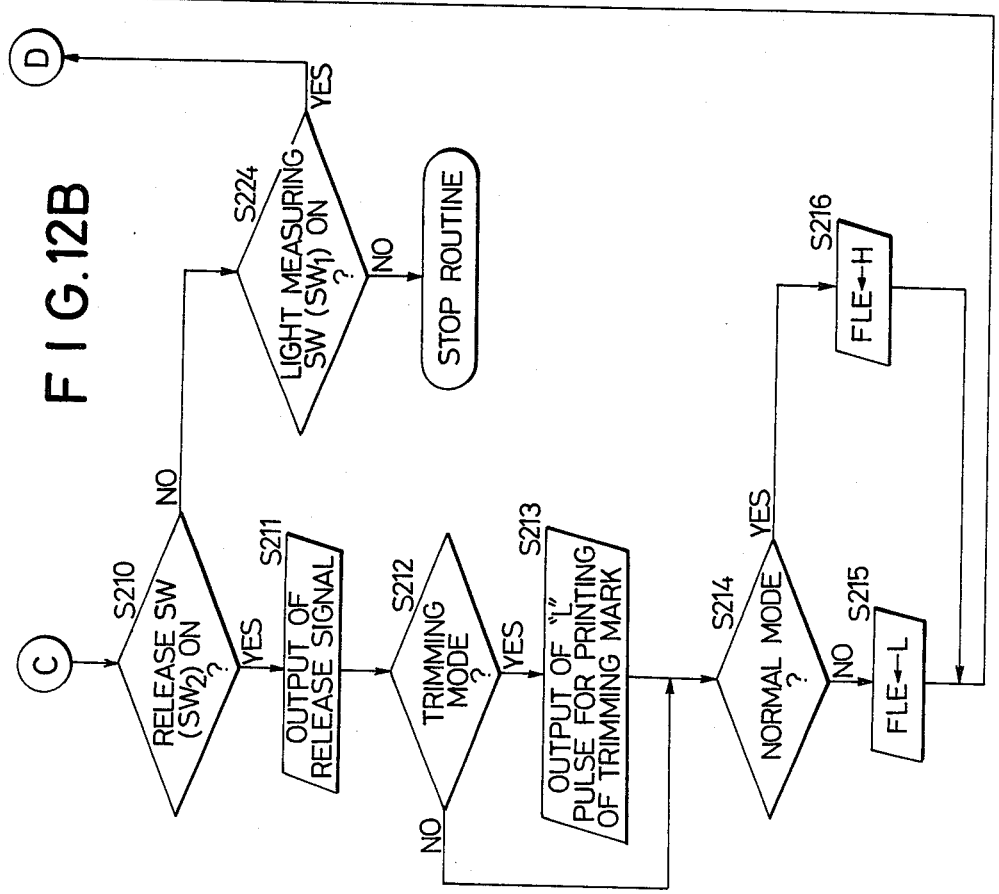
FIG. 12B

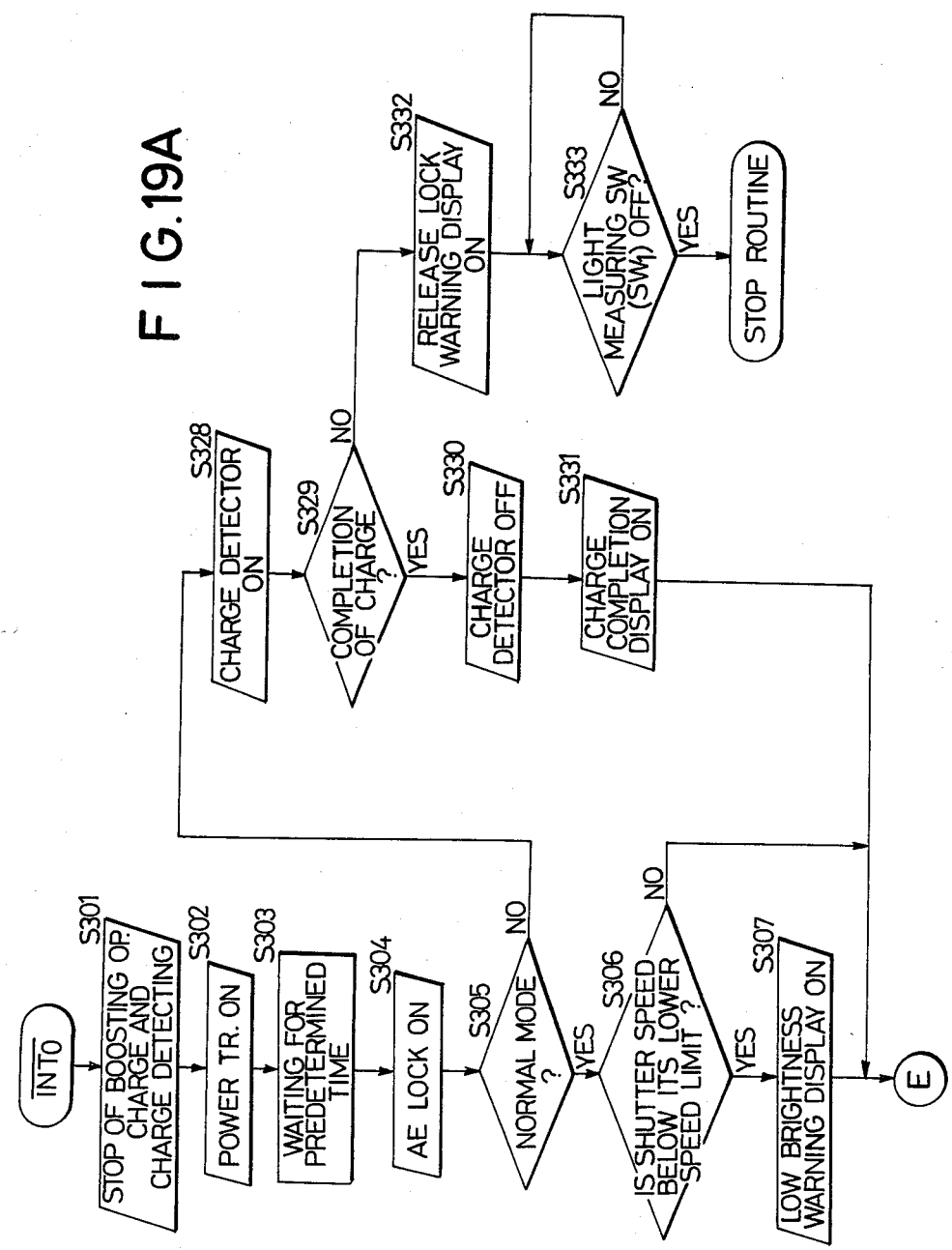

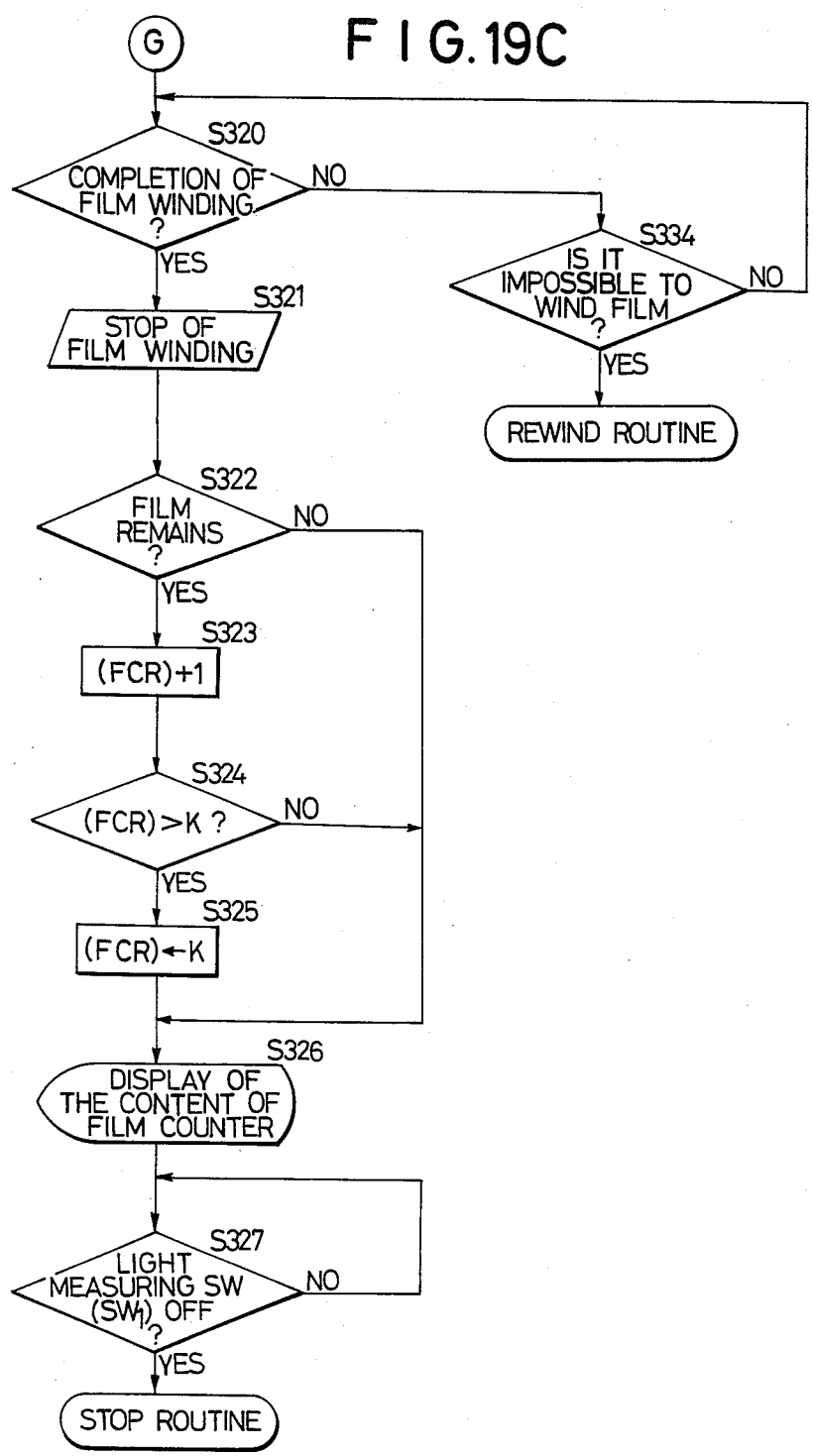

F I G. 21
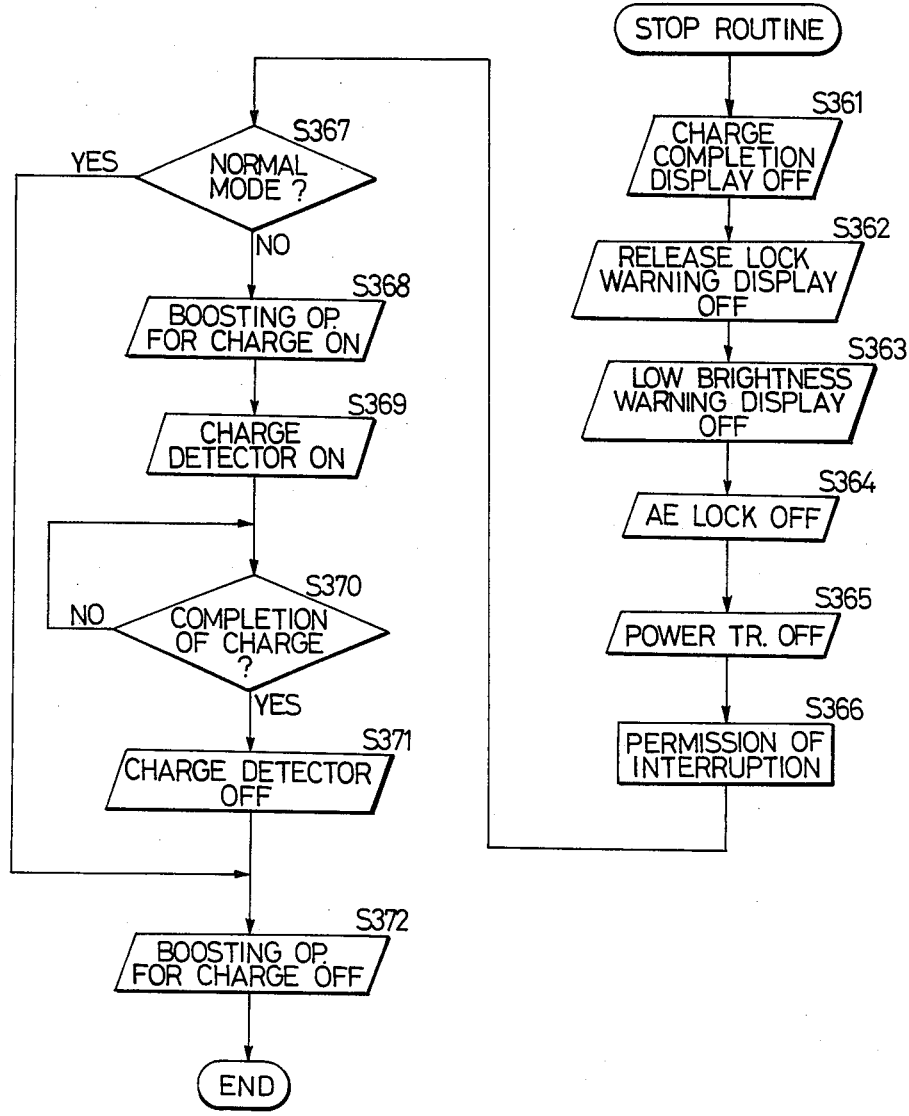

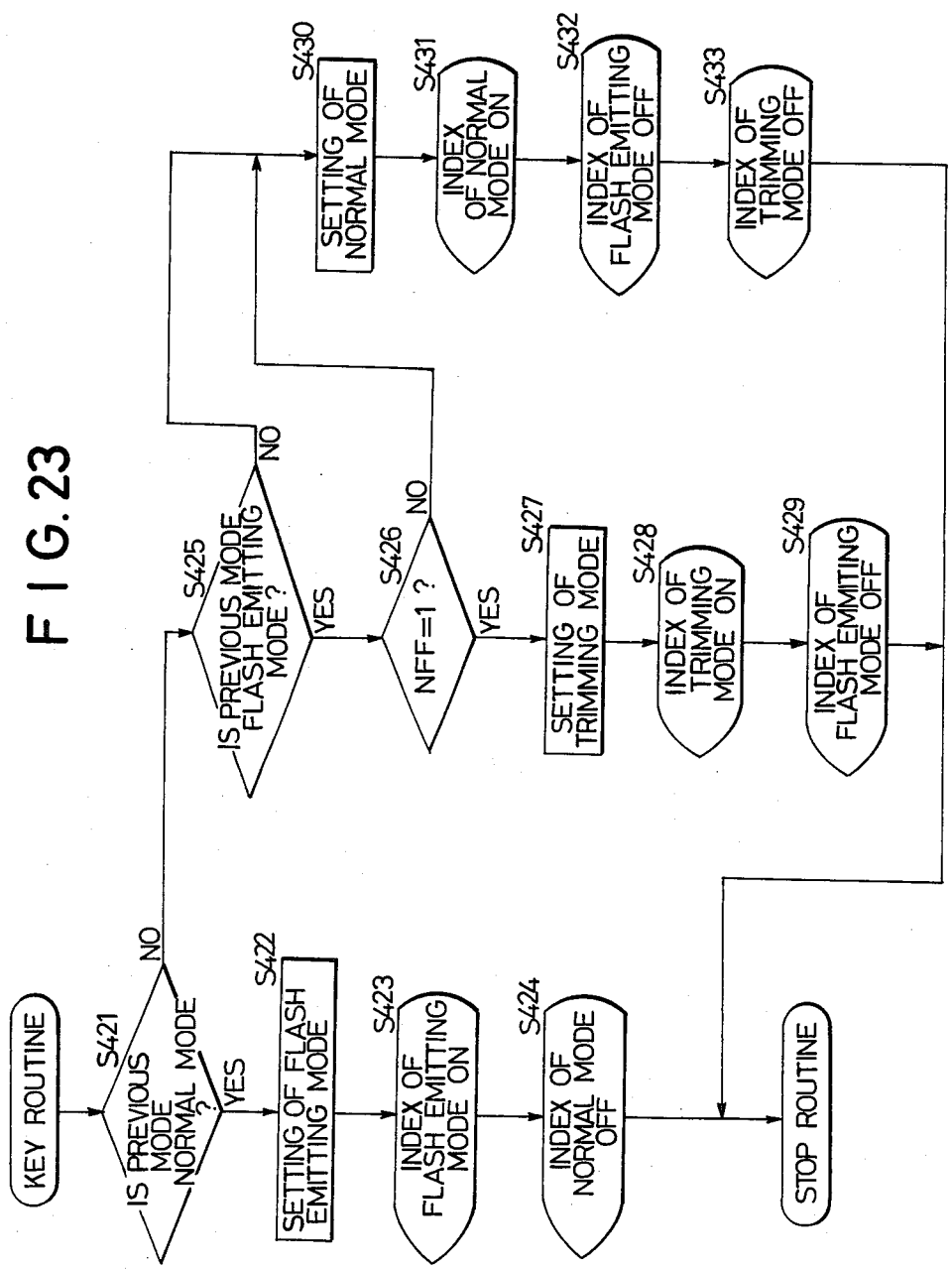

PHOTOGRAPHIC CAMERA

BACKGROUND OF THE INVENTION

1. Field of the Invention

The present invention relates to a camera having a real focal length photographing mode (normal mode) for printing a normal photographing range on a photographic paper and a pseudo focal length photographing mode (trimming mode) for printing in a narrower range of field and effecting a film printing at an enlarging ratio different from a normal enlarging ratio in printing to obtain a print as if it had been photographed by a telephoto lens.

2. Description of the Prior Art

In photographing, it is important to decide a composition to be reproduced on a photographic paper. To this end, there are known a method in which the distance up to an object to be photographed is changed or photographing is performed using an interchangeable lens or a zoom lens, and a method in which a film is checked after photographing and a decision of composition to be reproduced is made by trimming.

As a camera based on the method utilizing trimming there has been proposed a camera in U.S. Pat. No. 3,490,844 and Japanese Patent Application Laid-open Publication No. 54-26721 (26721/79) in which a finder optical system capable of changing the size of field indicated therein is provided in the camera to thereby select an image frame range to be photographed, and a trimming information is recorded on a film in interlock with the finder optical system, while in printing, a part of the photographed image frame is printed at an enlarging ratio different from a normal enlarging ratio on the basis of the trimming information, whereby there can be obtained a print as if it had been photographed by a telephoto lens having a focal length larger than that of the lens originally attached to the camera.

When a photograph taken from an object in such pseudo focal length photographing mode is compared with a photograph taken from the same object but using a lens having a focal length equal to that which has been set in a pseudo manner by the pseudo focal length photographing mode, it is seen that the depth of field is larger in the former by the trimming proportion than in the latter.

If the distance up to an object is U (provided U>>f) and F-number of a lens is F, and the diameter of an allowable circle of confusion is $\delta$, then a depth of field $a_1$ of a lens having a focal length $f=f_1$ is represented as follows:

$$a_1 \approx \frac{2U^2 \delta F}{f_1^2} \quad (1)$$

Likewise, a depth of field $a_2$ of a lens having a focal length $f=f_2$ is represented as follows:

$$a_2 \approx \frac{2U^2 \delta F}{f_2^2} \quad (2)$$

On the other hand, in the where a photograph taken by the lens of focal length $f=f_1$ is subjected to trimming so that it corresponds to a photograph taken by the lens of focal length $f=f_2$, the diameter of a confusion circle corresponding to $f=f_2$ must be $\delta$, so the diameter of a confusion circle at $f=f_1$ becomes $\delta \times f_1/f_2$. A depth of field $a_3$ at this time is represented as follows:

$$a_3 \approx \frac{2U^2 \delta F}{f_1 \cdot f_2} \quad (3)$$

Therefore, if a comparison is made between the depth of field $a_3$ obtained after trimming of the photograph taken by the lens of focal length $f=f_1$ and the depth of field $a_2$ of the photograph taken by the lens of focal length $f=f_2$, there is obtained the following result:

$$a_3 = a_2 \frac{f_2}{f_1}$$

Thus, the depth of field is larger $f_2/f_1$ times in the adoption of trimming and this magnification corresponds to the proportion of trimming, so the depth of field becomes larger by an amount corresponding to the proportion of trimming.

As a result, in the case of a print obtained from photographing in a pseudo focal length photographing mode, the probability of both a main object and surrounding objects entering the depth of field increases and the resulting photograph is in focus to both the main object and the surrounding objects, making it difficult to make a clear distinction of the two. Consequently, the photograph is confused and unsightly.

Further, when a color photograph of a person is taken using a flash light emitting device in a dark place, the person's eye is sometimes photographed as a red eye, and this phenomenon is called a red-eye phenomenon. Although this phenomenon has not been made clear completely, it is said that the light emitted from the flash light emitting device is reflected by the choroid located behind the retina in the interior of the human's eyeball and this reflected light causes the pupil to be photographed red.

This red-eye phenomenon is apt to occur when the distance between the photographing lens of the camera and the flash light emitting device is short or as the photographing distance between the photographing lens of the camera and the eye of person to be photographed.

As a solution to this problem there has been proposed a camera constructed so that the sufficient distance between the flash light emitting device and an optical axis of the photographing lens can be maintained constant (see Japanese Patent Publication No. 58-20021 (20021/83)).

In the photographing with a camera having a pseudo focal length photographing mode, a part of a photographed image frame is enlarged and even a remote object is printed large as if it had been photographed using a telephoto lens, so that there inevitably is a tendency to photographing a remote object as compared with the real focal length photographing mode, and the red-eye phenomenon is apt to occur as previously explained.

In the case of a photograph which has been taken in the real focal length photographing mode, even in the event the red-eye phenomenon should occur, it will not be so conspicuous because the enlarging ratio in printing is low. On the other hand, in the case of a photograph which has been taken in the pseudo focal length photographing mode, if the red-eye phenomenon should occur, it will be conspicuous because the enlarging ratio in printing is high.

SUMMARY OF THE INVENTION

It is an object of the present invention to provide a camera capable of effecting a flash photographing forcibly upon selection of a pseudo focal length photographing mode and affording a photograph having a stereoscopic feeling.

It is another object of the present invention to provide a camera capable of preventing the red-eye phenomenon which is apt to occur in flash photographing upon selection of a pseudo focal length photographing mode.

It is a further object of the present invention to provide a camera which permits the selection of a pseudo focal length photographing mode when a negative film is loaded into the camera.

The above and other objects and features of the invention will appear more fully hereinafter from a consideration of the following description taken in connection with the accompanying drawing wherein one example is illustrated by way of example.

BRIEF DESCRIPTION OF THE DRAWINGS

FIGS. 1 to 6 illustrate a first embodiment of the present invention, of which:

FIG. 1 is a perspective view of a camera;

FIG. 2 is a fron view thereof;

FIG. 3 is a camera system circuit diagram;

FIG. 5 is a flowchart of a stop routine; and

FIG. 6 is a flowchart of an interruption handling routine based on photographing mode selection.

FIGS. 7 to 14 illustrate a second embodiment of the present invention; of which:

FIG. 7 is a perspective view of a camera;

FIGS. 8, 9 and 10 are front views showing changes in external appearance of the camera with change-over of photographing mode, FIG. 8 illustrating the state of a real focal length photographing mode, FIG. 9 illustrating the state of a flash emitting mode and FIG. 10 illustrating the state of a pseudo focal length photographing mode;

FIG. 11 is a camera system circuit diagram; FIGS. 12A and 12B are flowcharts of an interruption handling routine on photographing;

FIG. 13 is a flowchart of a stop routine; and

FIG. 14 is a flowchart of an interruption handling routine based on photographing mode selection.

FIGS. 15 to 24 illustrate a third embodiment of the present invention, of which:

FIG. 15 is a perspective view of a camera;

FIGS. 16 and 17 are front views of a liquid crystal display panel, FIG. 16 illustrating the panel with a negative film loaded in the camera and FIG. 17 illustrating the panel with a positive film loaded in the camera;

FIG. 18 is a camera system circuit diagram;

FIGS. 19A, 19B and 19C are flowcharts of an interruption handling routine on photographing;

FIG. 20 is a flowchart of a rewind routine;

FIG. 21 is a flowchart of a stop routine;

FIG. 23 is a flowchart of a photographing mode selecting routine; and

FIG. 24 is a flowchart of a back lid opening routine.

DESCRIPTION OF PREFERRED EMBODIMENTS

Embodiments of the present invention will be described hereinunder with reference to the accompanying drawings.

First Embodiment

The first embodiment is an example of a camera having two kinds of photographing modes which are a real focal length photographing mode (normal mode) and a pseudo focal length photographing mode (trimming mode).

Figure 1:
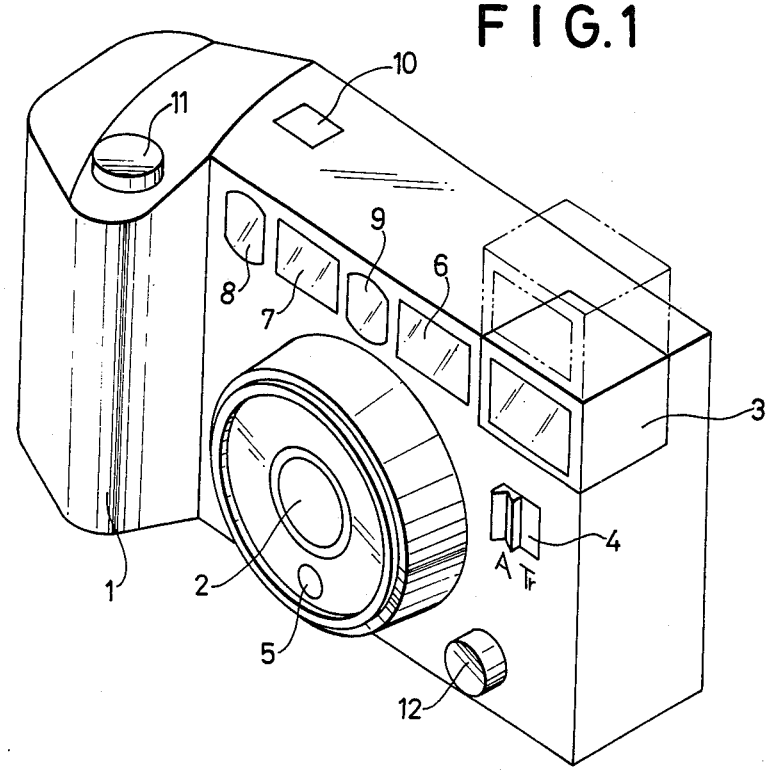

FIG. 1 is a perspective view showing an external appearance of the first embodiment, in which the numeral 1 denotes a camera body; numeral 2 denotes a photographing lens, and numeral 3 denotes a flash light emitting device, broken lines indicating a photographing position in a pseudo focal length photographing mode. Further, numerals 4, 5, 6 and 7 denote a photographing mode change-over button, a light detecting window of an automatic exposure control device, a finder window, and a finder illuminating window, respectively. Numerals 8 and 9 each represent a range finder window of an automatic focusing device. And numerals 10, 11 and 12 denote a film counter, a shutter release button, and a flash forcing button, respectively.

Figure 2:
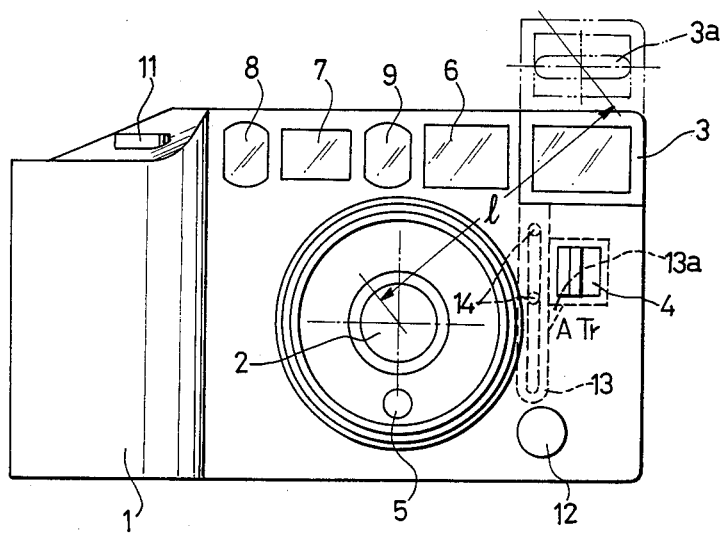

FIG. 2 is a front view of the first embodiment, showing a position of a lift lever 13 interlocked with the photographing mode change-over button 4 and that of a retaining portion 13a thereof. Numeral 14 denotes a guide pin for the lift lever 13. Numeral 3a denotes a light emitting tube in a flash light emitting device 3. The distance between the center of an optical axis of the photographing lens 2 and the light emitting tube 3a is indicated by l.

In this embodiment there are provided two kinds of photographing modes which are a real focal length photographing mode A and a pseudo focal length photographing mode Tr, and the photographing mode change-over button 4 is constructed so that it slides between the two positions of A and Tr to effect the change-over of mode, as shown in FIGS. 1 and 2.

FIG. 2 shows a construction of a photographing mode change-over portion. An explanation will now be made about a mechanism for moving the flash light emitting device upon change-over from one to another photographing mode. The lift lever 13 is urged upward by means of a spring (not shown) in a position adjacent to the photographing mode change-over button 4, and the flash light emitting device 3 is mounted on top of the lift lever 13. The photographing mode change-over button 4 is normally urged to the real focal length photographing mode A side by means of a spring (not shown).

When the photographing mode change-over button 4 is in the position of the real focal length photographing mode A, the retaining portion 13a of the lift lever 13 and the change-over button 4 are in engagement with each other and the flash light emitting device 3 is in its lower position indicated by solid line in FIG. 2.

When the photographing mode change-over button 4 is changed over to the position of the pseudo focal length photographing mode Tr, the retaining portion 13a of the lift lever 13 and the change-over button 4 are disengaged from each other, so the lift lever 13 rises and the flash light emitting device 3 mounted on top thereof reaches its raised position indicated by broken line in FIG. 2.

As a result, the distance l between the optical axis of the photographing lens and the center of the light emitting tube 3a in the flash light emitting device 3 becomes larger than that in the real focal length photographing mode.

When the flash light emitting device 3 is pushed downward, it goes down to its lower position in the real focal length photographing mode reversely to the above, and the photographing mode change-over button 4 also returns to the position of the real focal length photographing mode A, so that the retaining portion 13a of the lift lever 13 and the photographing mode change-over button 4 again come into engagement with each other.

In the real focal length photographing mode, the photographing mode change-over button 4 is in the position A and the flash light emitting device 3 stays in its solid line position. In this state, in which an object to be photographed is bright, there is made an exposure control by an automatic exposure control device. At this time, if the emission of flash light is required due to rear light or for another reason, it can be done by pushing the flash forcing button 12.

In the pseudo focal length photographing mode, the photographing mode change-over button 4 is shifted to the position Tr and the flash light emitting device 3 goes up to its broken line position in FIG. 2, permitting the emission of flash light.

The photographing mode change-over button 4 is provided with a slide switch adapted to move in interlock with the change-over button, whereby a signal indicative of a photographing mode is provided to a later-described microprocessor.

Figure 3:
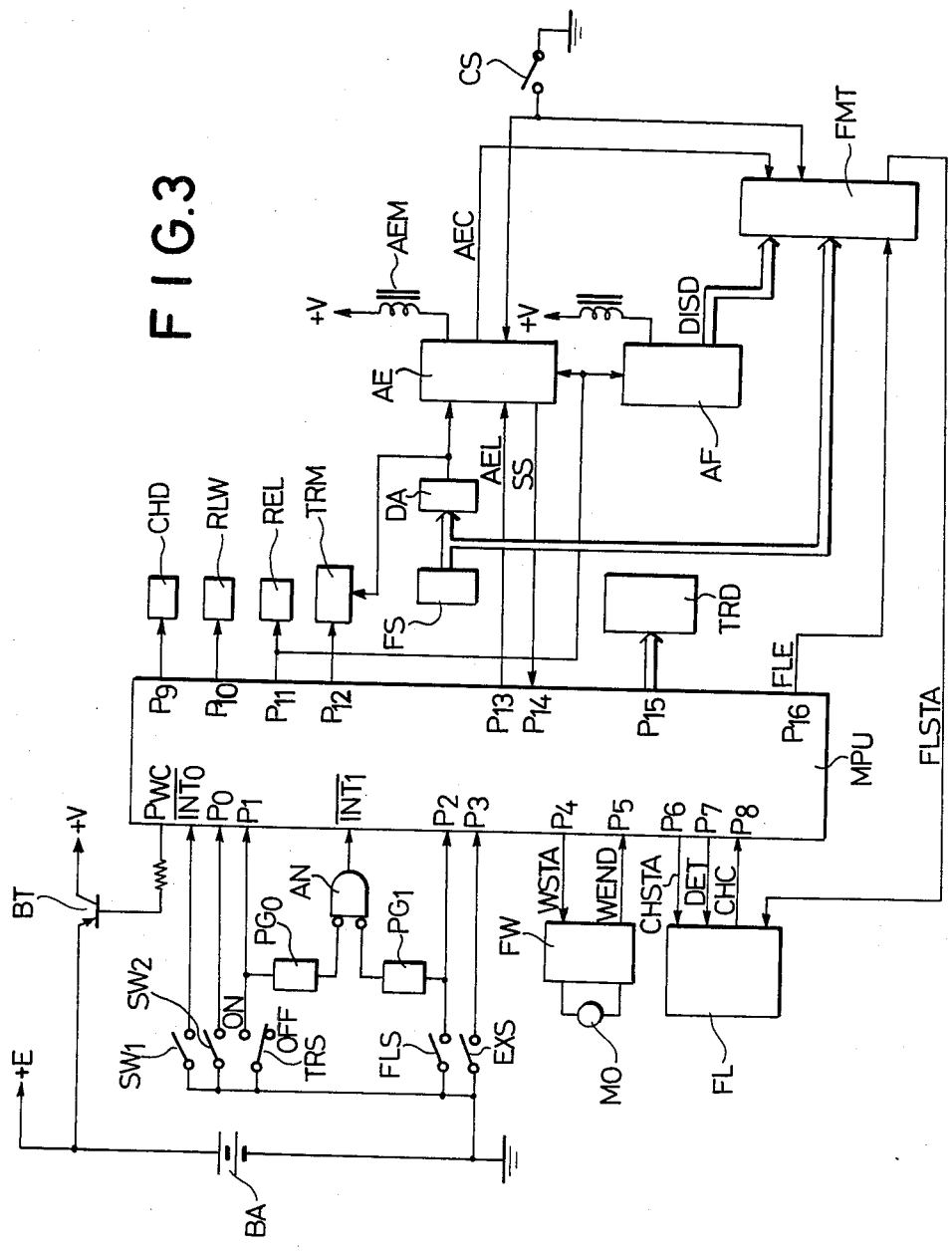

A camera system will now be explained. FIG. 3 is a circuit diagram of the camera system. Electric power supplied from a power battery BA is fed to a microprocessor MPU, a film winding control section FW, a flash light emitting section FL, pulse generators $PG_0$ and $PG_1$, an AND circuit AN, a frame display TRD, a film sensitivity setting section FS, a charge completion display element CHD, a release lock warning indicator RLW, and a release circuit REL. Further, from a power transistor BT which is operated by a signal provided from an output port $P_{wc}$ of the microprocessor MPU, electric power is supplied to an automatic exposure control device AE, an automatic focusing device AF, a trimming mark printing portion TRM, a D-A converter DA, a flashmatic timer FMT, etc.

Explanation will now be made about switches which are turned ON by the operation of operating switches of the camera. $SW_1$ denotes a light measuring switch, which is closed by depresing the shutter button 11 up to a first stage. $SW_2$ denotes a release switch, which is closed by depressing the shutter button 11 up to a second stage. TRS denotes a trimming switch, which closes when the photographing mode change-over button 4 is turned to the pseudo focal length photographing mode Tr, and which opens when the button 4 is turned to the real focal length photographing mode A. FLS denotes a flash switch, which closes upon depression of the flash forcing button 12. EXS denotes a switch which is not externally operated but turns ON upon completion of exposure control operation and OFF upon completion of charging of the automatic exposure control device AE. These switches are connected to an interruption terminal $\overline{INT_0}$ and input ports $P_0$, $P_1$, $P_2$, $P_3$, respectively, of the MPU. The switches TRS and FLS are connected to an interruption terminal $\overline{INT_1}$ of the MPU through pulse generators $PG_0$, $PG_1$ and AND gate AN for causing an interrupt to the MPU to re-se information which has been provided to the MPU, upon turning from ON to OFF or OFF to ON.

Where the photographing mode is changed from the real focal length photographing mode to the pseudo focal length photographing mode, or from the pseudo focal length photographing mode to the real focal length photographing mode, or when the forced emission of flash light is to be done or stopped, a pulse signal is provided to the MPU to cause an interrupt thereto and rewrite the flag stored therein.

The film winding control section FW drives a film winding motor MO in accordance with a winding command signal WSTA provided from an output port $P_4$ of the MPU. Upon winding up of the film by a predetermined length, e.g. one frame, the film winding control section FW stops winding of the film and provides a film winding end signal WEND to an input port $P_5$ of the MPU.

The flash light emitting section FL is boosted upon receipt of a charge start command signal CHSTA from an output port $P_6$ of the MPU, to start charging of a main capacitor. To check the state of charging of the main capacitor, a detector actuating signal DET is provided form an output port $P_7$ of the MPU. Upon completion of charging of the main capacitor in the flash light emitting device, a charge completion signal CHC is provided from the flash light emitting section FL to an input port $P_8$ of the MPU. The flash light emitting section FL actuates a xenon tube provided in the interior thereof upon receipt of a light emission command signal FLSTA from a later-described flashmatic timer FMT. Moreover, a charge completion signal is provided from an output port $P_9$ of the MPU upon completion of charging of the main capacitor in the flash light emitting section FL to light the charge completion display element CHD. In the flash emitting mode, in order to prevent from the shutter release operation before completion of charging of the main capacitor in the flash light emitting device, the shutter release operation is locked before the completion of charging in the MPU and at the same time a release lock warning signal is provided from a output port $P_{10}$ of the MPU to light the release lock warning display RLW.

When the power transistor BT is turned ON, the automatic exposure control device AE operates to make the measurement of brightness of object to be photographed. Upon issuance of an AE lock signal AEL from an output port $P_{13}$ of the MPU, an exposure value $E_v$ obtained from the light measure value at that moment and the film sensitivity are locked. This is termed AE lock.

As to the above film sensitivity information, the film sensitivity setting section FS is set by automatic reading of DX code on the film patrone or by manual operation, and an output signal therefrom is fed to the automatic exposure control device AE as an analog signal through the D/A converter DA, and it is also fed to the flashmatic timer FMT as will be described later.

In the automatic exposure control device AE, when it is judged as a result of exposure calculation that the field is dark and the shutter speed exceeds a lower speed limit, a lower speed limit signal SS is provided to an input port $P_{14}$ of the MPU.

When the power transistor BT turns ON, the automatic focusing device AF also starts operating to measure the distance up to an object and store data on distance, and it provides the distance data DISD to the flashmatic timer FMT. Upon issuance of a release signal from an output port $P_{11}$ of the MPU, the release circuit REL operates to disengage the lens, so that the lens starts moving, while the amount of its movement is measured in terms of pulses until coincidence with the prestored distance data, whereupon a driving magnet AFM is deenergized to stop the movement of the lens.

Turning again to the automatic exposure control device AE, when the release signal from the output port $P_{11}$ is provided and the operation of the automatic exposure control device AE is completed, the shutter begins to open through a mechanical interlock and a count switch CS turns ON. The shutter is a triangular wave-shaped shutter which also serves as a disphragm. Pulses are provided from an encoder which is interlocked with the movement of the shutter, and these pulses are counted. When the counted pulse value coincides with the previously AE-locked exposure value $E_v$, it is judged that the exposure is appropriate, and a driving magnet AEM is deenergized to close the shutter.

In the case of a dark object, the shutter speed becomes lower, but when an exposure value $E_v$ obtained by light measurement of the object becomes below a value $E_{vc}$ determined in accordance with the combination of the lower limit speed of the shutter and an aperture value, there is made a limitation of speed to prevent a further decrease of the shutter speed. More specifically, in the automatic exposure control device AE, when the count switch CS turns ON, an internal timer starts operating, and after the lapse of a predetermined time, the shutter driving magnet AEM is deenergized forcibly. And after a predetermined time at which a closing motion of the shutter starts actually, a shutter closing signal AEC is provided to the flashmatic timer FMT, which in turn provides a flash emission start signal FLSTA to the flash light emitting section FL to emit flash light.

The flashmatic timer FMT starts operation in accordance with a signal FLE provided from an output port $P_{16}$ of the MPU. The flashmatic timer FMT calculates a flash light emission start timing data for the flash light emitting section FL on the basis of the distance data DISD provided from the automatic focusing device AF and the film sensitivity data provided from the film sensitivity setting section FS. When the counting start time which counting is started by the action of the count switch CS adapted to close upon start of opening of the shutter, has come to satisfy the above flash light emission start timing data, the flashmatic timer FMT provides a flash emission start signal FLSTA to the flash light emitting section FL, whereby flash light is emitted when the shutter blade has opened up to a position suitable for affording a required exposure. Thus, an appropriate exposure can be afforded. On the other hand, in the case where the shutter closing signal AEC is provided before the foregoing time satisfies the flash emission start timing data, that is, if the shutter is forced to start closing due to the shutter low speed limitation as previously explained in connection with the automatic exposure control device AE, there is provided the shutter closing signal AEC. In this case, however, upon receipt of the signal AEC, the flashmatic timer FMT provides a flash emission start signal FLSTA to the flash light emitting section FL to emit flash light.

When the pseudo focal length photographing mode is selected, a pseudo focal length photographing mode signal is provided from an output port $P_{15}$ of the MPU and a frame display TRD indicative of a printing area is made in the finder. For example, liquid crystal device may be used for this display.

Further, a trimming mark is printed on the film at the time of exposure control and this is done by a printing circuit TRM. This circuit TRM starts a printing operation upon receipt of "L" pulse from an output port $P_{12}$ of the MPU and performs the same operation for a period of time corresponding to the film sensitivity data provided from the D-A converter DA.

The following description is now provided about signal processings in photographing-related portions performed within the MPU.

Figure 4A:
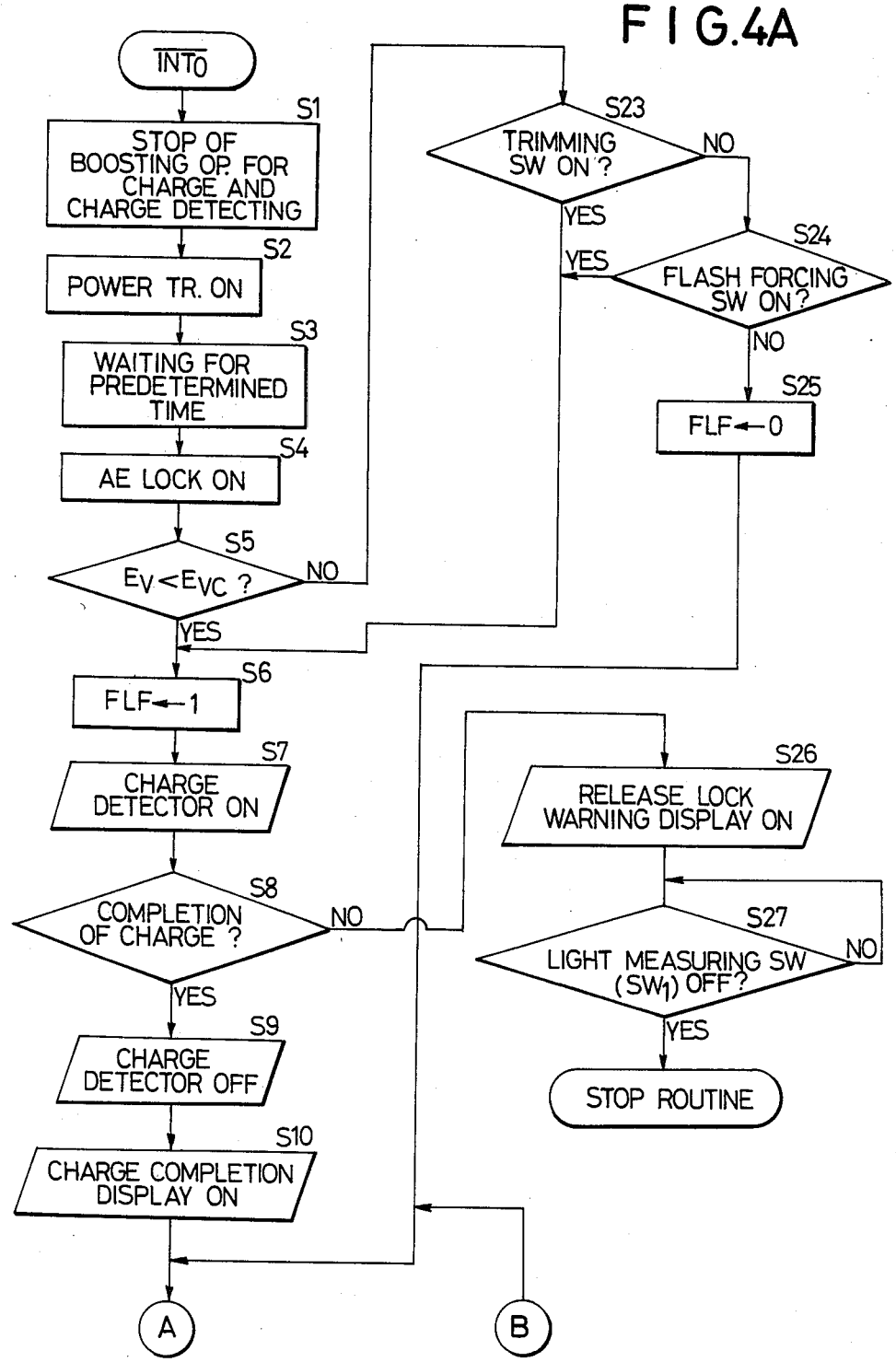
FIGS. 4A and 4B are flowcharts of an interruption handling routine on photographing.
Figure 4B:
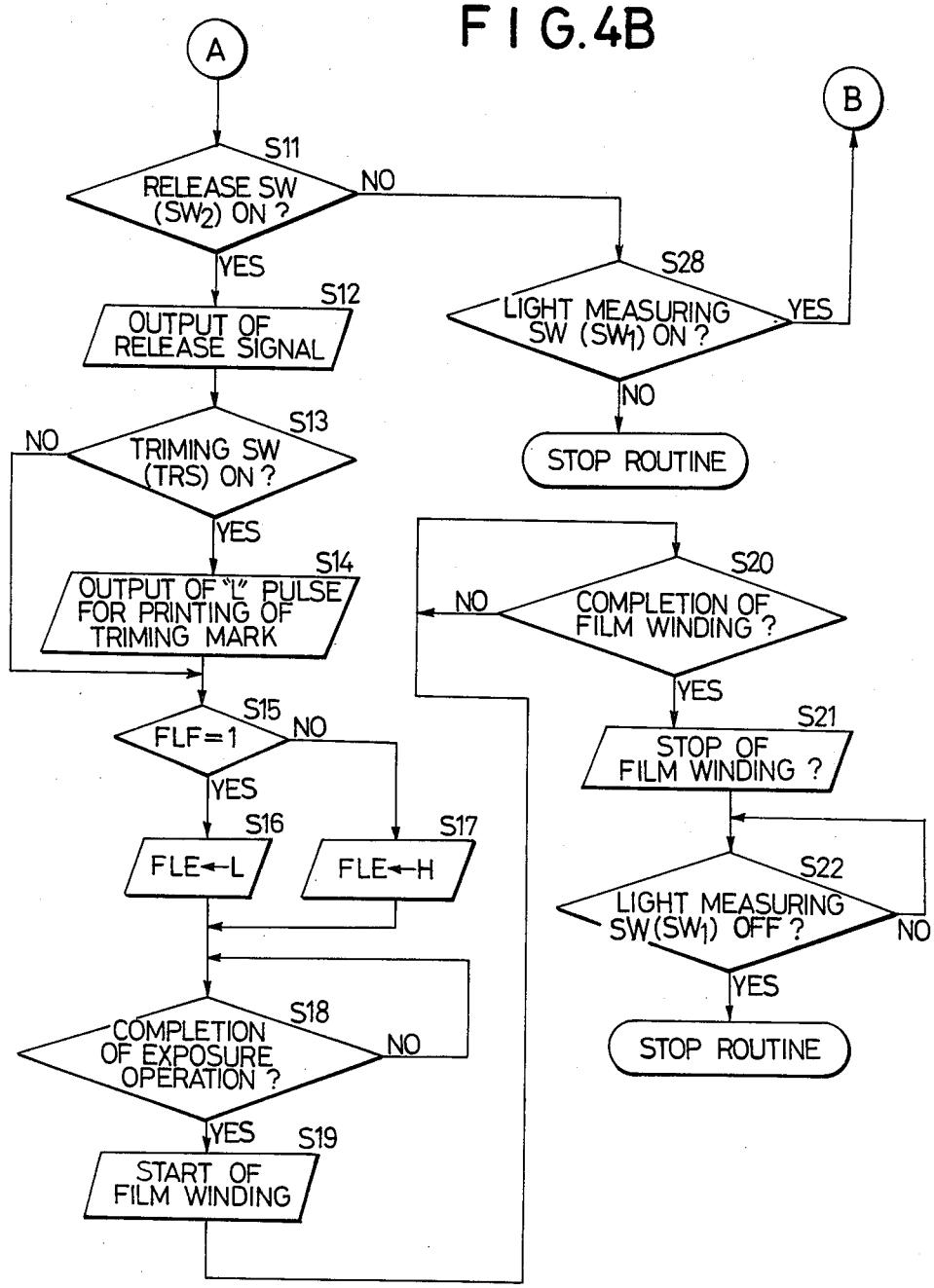

FIG. 4 shows an interrupt processing caused by closing of the light measuring switch $SW_1$ upon depression of the shutter release button 11 up to the first stage. Upon arrival of an interruption signal at the terminal $\overline{INT_0}$, the boosting operation for charging the main capacitor in the flash light emitting section FL and the operation for detecting a charged state of the main capacitor are stopped (step S1). This is because if the exposure control device AE is operated by an interrupt processing during boosting, there is fear that the exposure control would not be effected correctly because the supply voltage is in a dropped state.

Next, the power transistor BT is turned ON (step S2) to supply electric power to the automatic exposure control device AE, the automatic focusing device AF and so on. After waiting for a predetermined time due to the operation of AE and AF, a measured value is memorized and the AE lock is effected (steps S3 and S4).

Judgment is made (step S5) as to whether the calculated exposure value $E_v$ is smaller than the lower speed limit exposure value $E_{vc}$ which is determined from a predetermined combination of shutter speed and aperture value. If the answer is affirmative, that is, when the field is dark, "1" is set to a flash flag FLF (step S6). The charge detector in the flash light emitting section FL is turned ON to check whether charging is completed or not (steps S7 and S8). If the answer is negative, program passes to step S26 to bring about a release lock state and light the release lock warning indicator RLW. Then, upon turning OFF of the light measuring switch $SW_1$ (step S27), program shifts to a stop routine as will be described later.

When the charging of the main capacitor of the flash light emitting section FL is completed, the charge detector is turned OFF and the charge completion display element CHD is lit, then a check is made as to whether the release switch $SW_2$ is ON or not (steps S9, S10 and S11).

After the AE lock, when a low speed limit is judged in step S5 and the calculated exposure value $E_v$ is larger than the low speed limit exposure value $E_{vc}$, program passes to step S23, in which judgment is made as to whether the trimming switch TRS is ON or not. If the answer is affirmative, that is, if the camera is in the pseudo focal length photographing mode, the emission of flash light is to be made, so the program passes to step S6 and "1" is set to the flash flag FLF. On the other hand, if the camera is not in the pseudo photographing mode, judgment is made as to whether the flash emission forcing switch FLS is ON or not (step S24), and if the answer is affirmative, program passes to step S6, in which "1" is set to the flash flag FLF. If the switch FLS is not ON, "0" is set to the flash flag FLF (step S25) and program passes to step S11 to check whether the release switch SW₂ is ON or not.

If the answer is negative in step S11, judgment is made as to whether the light measuring switch SW₁ is ON or not, and if it is ON, a check is made again on SW₂, waiting for its turning ON. On the other hand, when the light measuring switch SW₁ is not ON, either, program passes to the stop routine (step S28).

If the release switch SW₂ is ON at step S11, a release signal is provided in step S12 to start the exposure controlling operation.

Then, judgment is made as to whether the trimming switch TRS is ON or not and if the answer is affirmative, "L" pulse for printing a trimming mark on the film is output to $P_{12}$, while this processing is omitted if the answer is negative (steps S13 and S14).

Then, judgment is made as to whether the flash flag FLF is "1" or not, and if the answer is affirmative, a flashmatic timer operation command signal FLE to be provided to the flashmatic timer FMT is made "L" to actuate the FMT, thereby permitting the emission of flash light. On the other hand, when the flag FLF is not "1", the above operation command signal FLE is made "H" so as not to actuate the flashmatic timer FMT (steps S15, S16 and S17).

Upon completion of the exposure operation, the winding of one frame of the film is started and performed until completion of the winding, whereupon the winding is stopped, and upon turning OFF of the light measuring switch SW₁, program passes to the stop routine (steps S18-S22).

FIG. 5 shows the stop routine. First, the flash charging completion display element CHD and the release lock warning display RLW are turned OFF, and further the charge detector, AE lock and power transistor BT are turned OFF, giving rise to a state which permits interruption (steps S31-S36). Then, judgment is made as to whether the flash flag FLF is "1" or not (step S37). If the answer is affirmative, then for the next photographing, the charge of the main capacitor in the flash light emitting section FL is performed, and the state of charging is checked. Upon completion of the charging, the detector and the booster are turned OFF to terminate the processing (steps S38-S42). When the flash flag FLF is not "1", program shifts to step S42 immediately to turn OFF the booster and terminate the processing.

Figure 6:
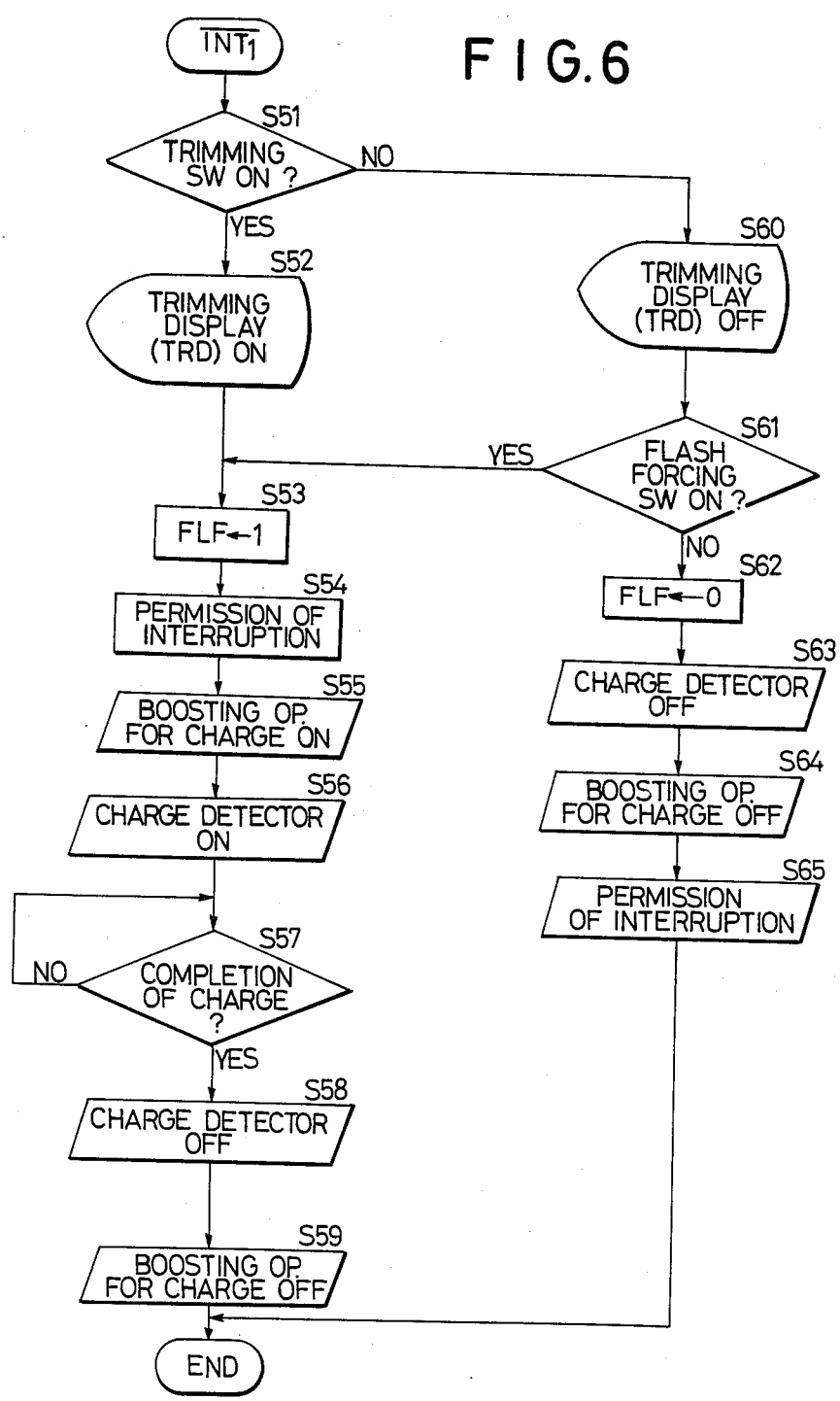

Reference is here made to FIG. 6 to explain an interrupt processing in a state in which interruption is generated at the interruption terminal $\overline{INT_1}$ upon turning ON→OFF or OFF→ON of the trimming switch TRS or ON→OFF or OFF→ON of the flash emission forcing switch FLS.

First, judgment is made as to whether the trimming switch TRS is ON or not (step S51), and if the answer is affirmative, the trimming display TRD is turned ON (step S52). Then, "1" is set to the flash flag FLF to permit interruption, thereafter the booster for charging the main capacitor in the flash light emitting section FL as well as the charge detector are turned ON, and upon completion of the charging, the detector and the booster are turned OFF to terminate the processing (steps S53-S59).

If it is judged in step S51 that the trimming switch TRS is not ON, the trimming display TRD is turned OFF (step S60) and judgment is made as to whether the flash emission forcing switch FLS is ON or not (step S61). If the answer is affirmative, program passes to step S53 and shifts to the previously-explained charging routine for the flash light emitting section FL. On the other hand, if the FLS is not ON, the flash flag FLF is set to "0", the detector and the booster are turned OFF, interruption is permitted, and thereafter processing is terminated (steps S62-S65).

SECOND EMBODIMENT

The second embodiment is an example of a camera having three kinds of photographing modes which are a real focal length photographing mode (normal mode), a flash emitting mode and a pseudo focal length photographing mode (trimming mode).

Figure 7:
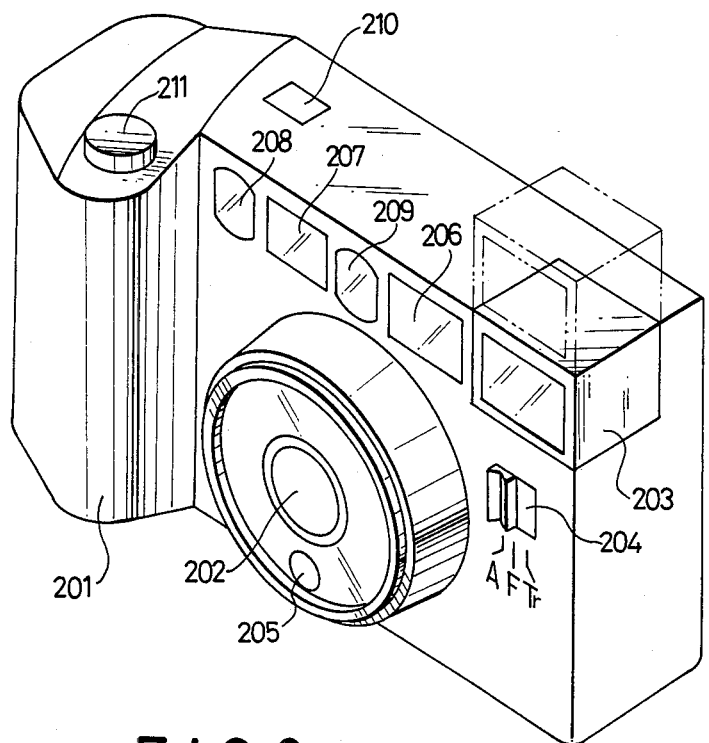

FIG. 7 is a perspective view showing an external appearance of the second embodiment, in which the numerals 201, 202 and 203 denote a camera body, a photographing lens and a flash light emitting device, respectively. Further, numeral 204 denotes a photographing mode change-over button, which, as shown in the same figure, is so constructed as to slidable among three positions of A, F and Tr to effect the change-over of mode from one to another. Numeral 205 denotes a light detecting portion in an automatic exposure control device, numeral 206 denotes a finder window; numeral 207 denotes a finder illuminating window; numerals 208 and 209 denote range finder windows in an automatic focusing device; numeral 210 denotes a film counter; and numeral 211 denotes a shutter release button.

Figure 8:
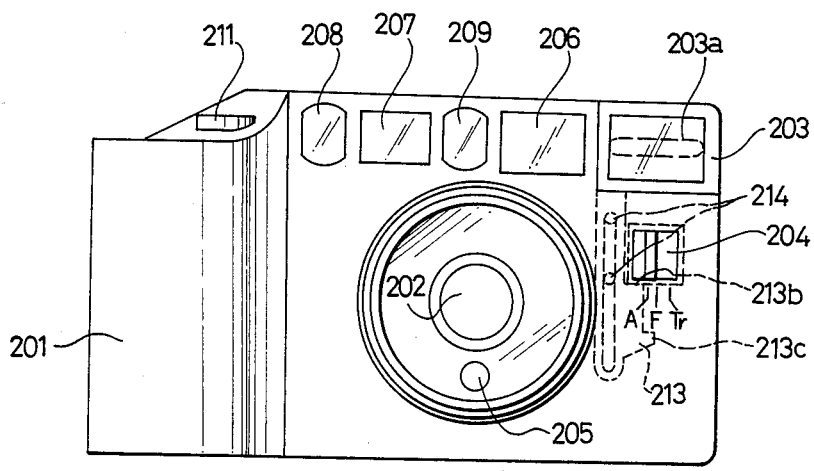
Figure 9:
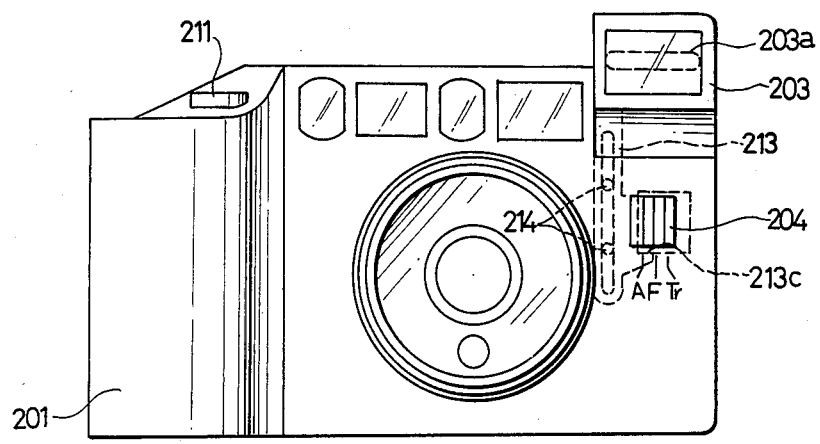
Figure 10:
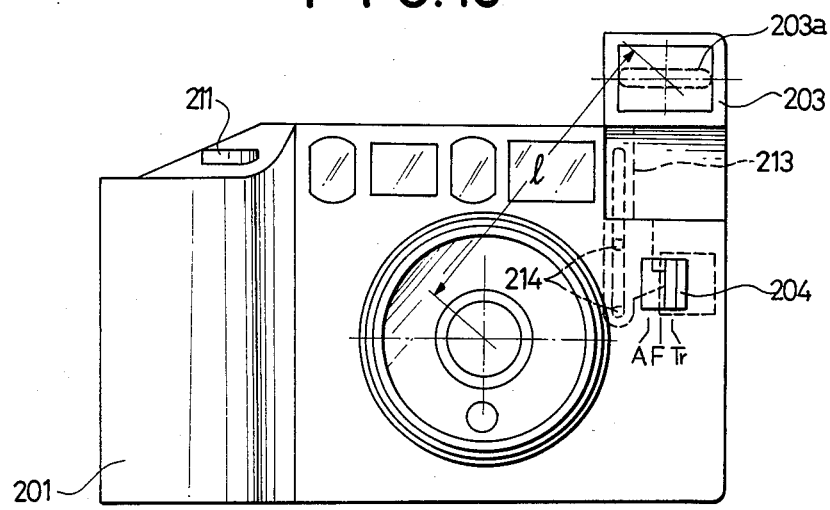

FIGS. 8, 9 and 10 are front views of a camera showing changes in position of a flash light emitting device caused by change-over of photographing modes from one to another, FIG. 8 showing the camera in a real focal length photographing mode, FIG. 9 in a flash emitting mode and FIG. 10 in a pseudo focal length photographing mode.

Explanation will now be made about a mechanism for moving a flash light emitting device at every change-over of photographing mode.

Adjacent to the photographing mode change-over button 204 is a lift lever 213 which is urged upward by means of a spring (not shown), with the flash light emitting device 203 being mounted on top of the lever. The lift lever 213 has two retaining portions 213b and 213c. The photographing mode change-over button 204 is urged to the real focal length photographing mode position A by means of a spring (not shown).

In the real focal length photographing mode, as shown in FIG. 8, the first retaining portion 203b of the lift lever 213 and the photographing mode change-over button 204 are in engagement with each other, and the flash light emitting device 203 is in its lowes position.

Next, when the photographing mode change-over button 204 is changed over to a flash emitting mode position F, the retaining portion 213c of the lift lever 213 comes into engagement with the photographing mode change-over button 204 and the flash light emitting device assumes a half-raised position, as shown in FIG. 9.

Further, when the photographing mode changeover button 204 is changed over to a pseudo focal length photographing mode Tr, the lift lever 213 is disengaged from the photographing mode change-over button 204 and rises to its highest position, so that the flash light emitting device 203 assumes a fully raised position, as shown in FIG. 10. As a result, the distance l between the center of an optical axis of the photographing lens and the light emitting tube 203a of the flash light emitting device becomes maximum.

Like the first embodiment, as the flash light emitting device is pushed down, the lift lever goes down to the position of the flash emitting mode and that of the real focal length photographing mode successively reversely to the above A slide brush is attached to the photographing mode change-over button 204 to change over electrical circuits from one to another as will be explained below in connection with a camera system circuit.

Figure 11:
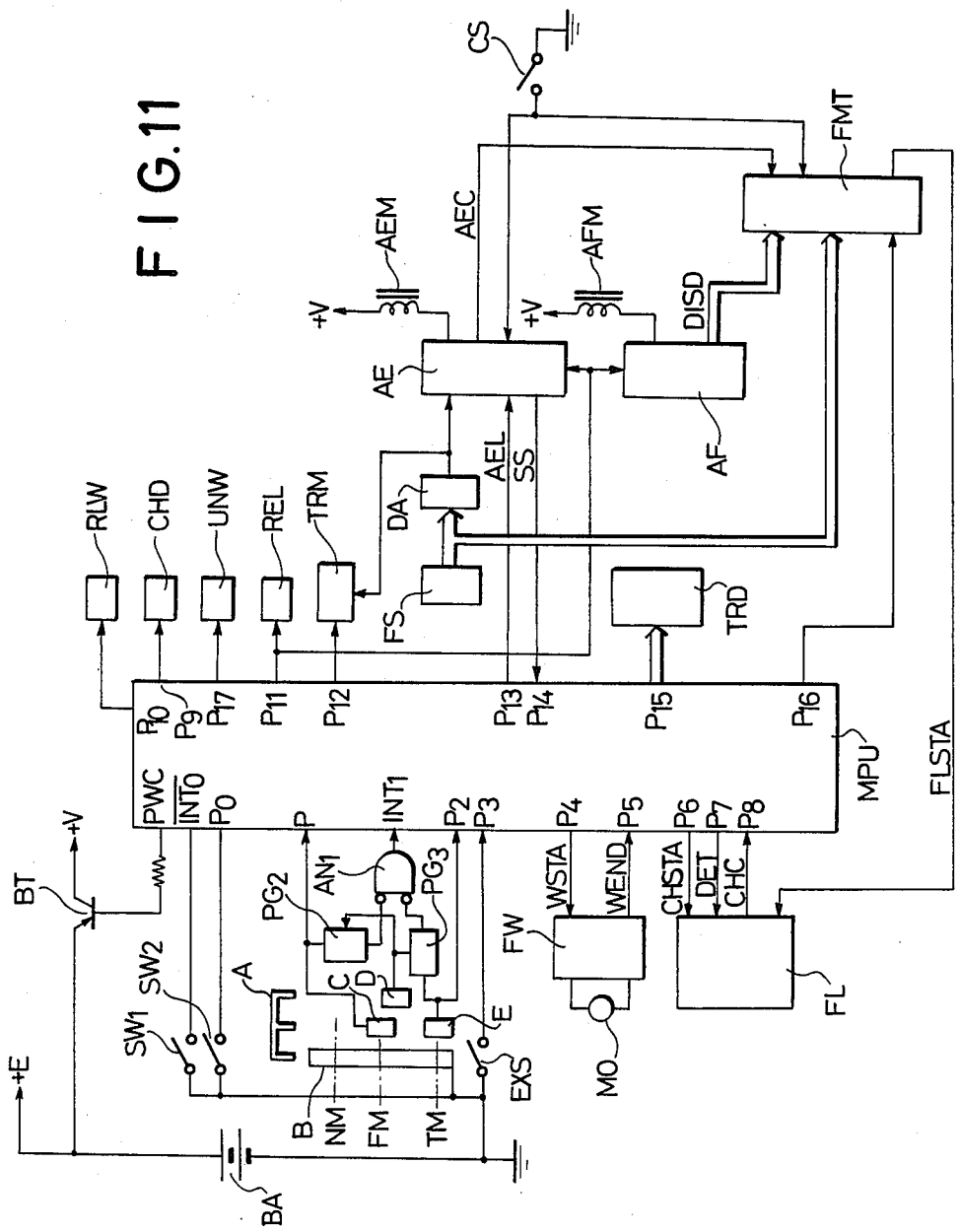

A camera system will now be explained. FIG. 11 is a circuit diagram of the camera system. Electric power supplied from a power battery BA is fed to a microprocessor MPU and so on, and from a power transistor BT which is operated by a signal provided from an output port $P_{wc}$ of the microprocessor MPU there is fed electric power to an automatic exposure control device AE, an automatic focusing device AF, a flashmatic timer FMT, a D-A converter DA and a trimming mark printing portion TRM.

Explanation will now be made about switches which are turned ON by the operation of operating switches of the camera. $SW_1$ denotes a light measuring switch, which is closed by depressing the shutter release button 211 up to a first stage. $SW_2$ denotes a release switch, which is closed by depressing the shutter release button 211 up to a second stage. These switches $SW_1$ and $SW_2$ are connected to interruption terminals $\overline{INT_0}$ and $P_0$, respectively, of the MPU.

A slide switch interlocked with the photographing mode change-over button 204 comprises a slider A and contact pieces B, C, D, E. The contact piece B is connected to a ground side of the power source. The contact piece C is connected to a pulse generator $PG_2$ and further to an input port $P_1$ of the MPU. The contact piece E is connected to a pulse generator $PG_3$ and further to an input port $P_2$ of the MPU. The contact piece D is connected to the pulse generators $PG_2$ and $PG_3$ and it controls the output of pulse signal.

The pulse generators $PG_2$ and $PG_3$ are each so constructed as to provide "H" pulse when the level of input signal changes from "H" to "L" and also when it changes from "L" to "H". This pulse is not provided when the contact piece D is at "L".

When the real focal length photographing mode is selected, the slider A is on the line NM in FIG. 11 and the outputs of the contact pieces C, D and E are all in the state of "H". In this state, therefore, signal is not provided form the pulse generators $PG_2$ and $PG_3$.

At the time of change-over from the real focal length photographing mode to the flash emitting mode, the slider A is forced to slide downward toward the line FM in FIG. 11. Upon contact of the slider A with the contact piece C, the output of the contact piece C is inverted to "L" and "H" pulse is provided from the pulse generator $PG_2$. Further, at the time of changeover from the flash emitting mode to the pseudo focal length photographing mode, the slider A is forced down toward the line TM in FIG. 11. In this case, also when the slider A leaves the contact piece C, "H" pulse is generated from the pulse generator $PG_2$, so this is inhibited by the contact piece D. Upon contact of the slider A with the contact piece E, the output of the contact piece E is inverted to "L" and "H" pulse is provided from the pulse generator $PG_3$.

The reason why the pulse generators $PG_2$ and $PG_3$ are so constructed as to provide "H" pulse not only when the level of input signal changes from "H" to "L" but also when it changes from "L" to "H", is that there is the case where the change-over of mode is done so that the slider A is moved upward in FIG. 11 in addition to the case where it is moved downward in the same figure from the real focal length photographing mode to the flash emitting mode and further to the pseudo focal length photographing mode as previously described.

EXS is not an externally operated switch, but it is an exposure completion switch which is turned ON upon completion of exposure control operation and OFF upon completion of charging of the automatic exposure control device.

UNW denotes a low brightness warning display which is lit by a low brightness warning signal developed at an output port $P_{17}$ of the MPU when an object is dark and the calculated shutter speed decreases below a lower limit speed in the real focal length photographing mode, namely, in the case of a natural light photographing.

Other points on circuit configuration and constructional elements as well as operations thereof are the same as in the first embodiment so will not be explained here.

The following description is now provided about signal processings in photographing-related portions performed within the MPU.

Figure 12A:
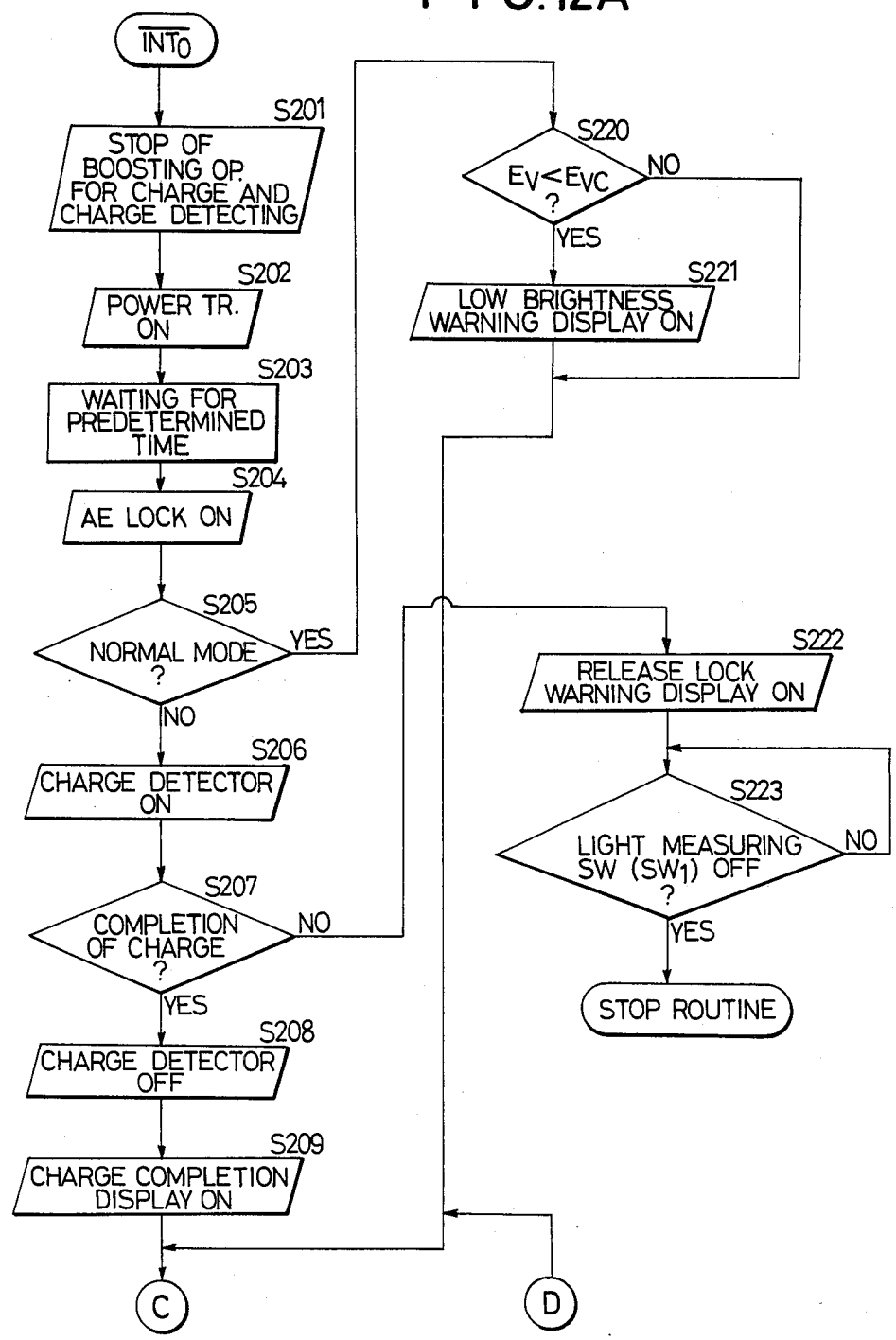

FIG. 12 shows an interrupt processing caused by closing of the light measuring switch $SW_1$ upon depression of the shutter release button 211. Upon generation of an interrupt the boosting operation for charging the main capacitor of flash light emitting section FL and the operation for detecting a charged state are stopped (step S201). This is because if the exposure control mechanism is operated by an interrupt processing during boosting, there is fear that the exposure control would not be effected correctly because the supply voltage is in a dropped state.

Next, the power transistor BT is turned ON (step S202) to supply electric power to the automatic exposure control device AE, the automatic focusing device AF and so on. After waiting for a predetermined time due to the operation of AE and AF, a measured exposure value is memorized and the AE lock is effecte (steps S203 and S204).

Then, judgment is made as to whether the photographing mode is the real focal length photographing mode or not (step S205). If the answer is affirmative program passes to step S220, in which judgment is made as to whether a measured exposure value $E_y$ is smaller than a lower speed limit exposure value $E_{yc}$ which is determined in accordance with the combination of shutter speed and aperture value. If the answer is affirmative, namely, when the field is dark, the low brightness warning display UNW is lit. In this case, there is made only a warning display and an automatic flash light emission is not performed, and program shifts to checking of the state of the release switch $SW_2$ (steps S220 and S221).

When the photographing mode is not the real focal length photographing mode, the charge detector is turned ON to check whether charging is completed or not (steps S206 and S207). If the answer is negative, program passes to step S222 to bring about a shutter release lock state and light a release lock warning indicator RLW. Then, upon turning OFF of the light measuring switch $SW_1$, program shifts to a stop routine (step S223).

When the charging is completed in step S207, program passes to step S208 to turn OFF the detector, then a charge completion display element CHD is lit (step S209).

Then, judgment is made as to whether the release switch SW$_2$ is ON or not (step S210), and if the answer is negative, judgment is made as to whether the light measuring switch SW$_1$ is ON or not. If the answer is affirmative, program again shifts to checking the release switch SW$_2$. On the other hand, when the light measuring switch SW$_1$ is not ON, program passes to the stop routine (step S224).

When the release switch SW$_2$ is ON in the judgment of step S210, a release signal REL is provided to start the exposure controlling operation (step S211). Then, judgment is made as to whether the photographing mode is the pseudo focal length photographing mode or not, and if the answer is affirmative, "L" pulse is provided to P$_{12}$ to print a trimming mark on the film, while this processing is omitted if the answer is negative (steps S212 and S213).

Then, judgment is made again as to whether the photographing mode is the real focal length photographing mode or not, and if the answer is negative, namely, when the photographing mode is the flash emitting mode or the pseudo focal length photographing mode, a flashmatic timer operation command signal FLE to be provided to the flashmatic timer FMT is made "L" to actuate the FMT, thereby permitting the emission of flash light. When the photographing mode is the real focal length photographing mode, the operation command signal FLE is made "H" so as not to actuate the FMT (steps S214–S216).

Upon completion of the exposure operation at step S217, the winding of one frame of the film is started and performed until completion of the winding, whereupon the winding is stopped, and turning OFF of the light measuring switch SW$_1$, program passes to the stop routine (steps S217–S221).

Figure 13:
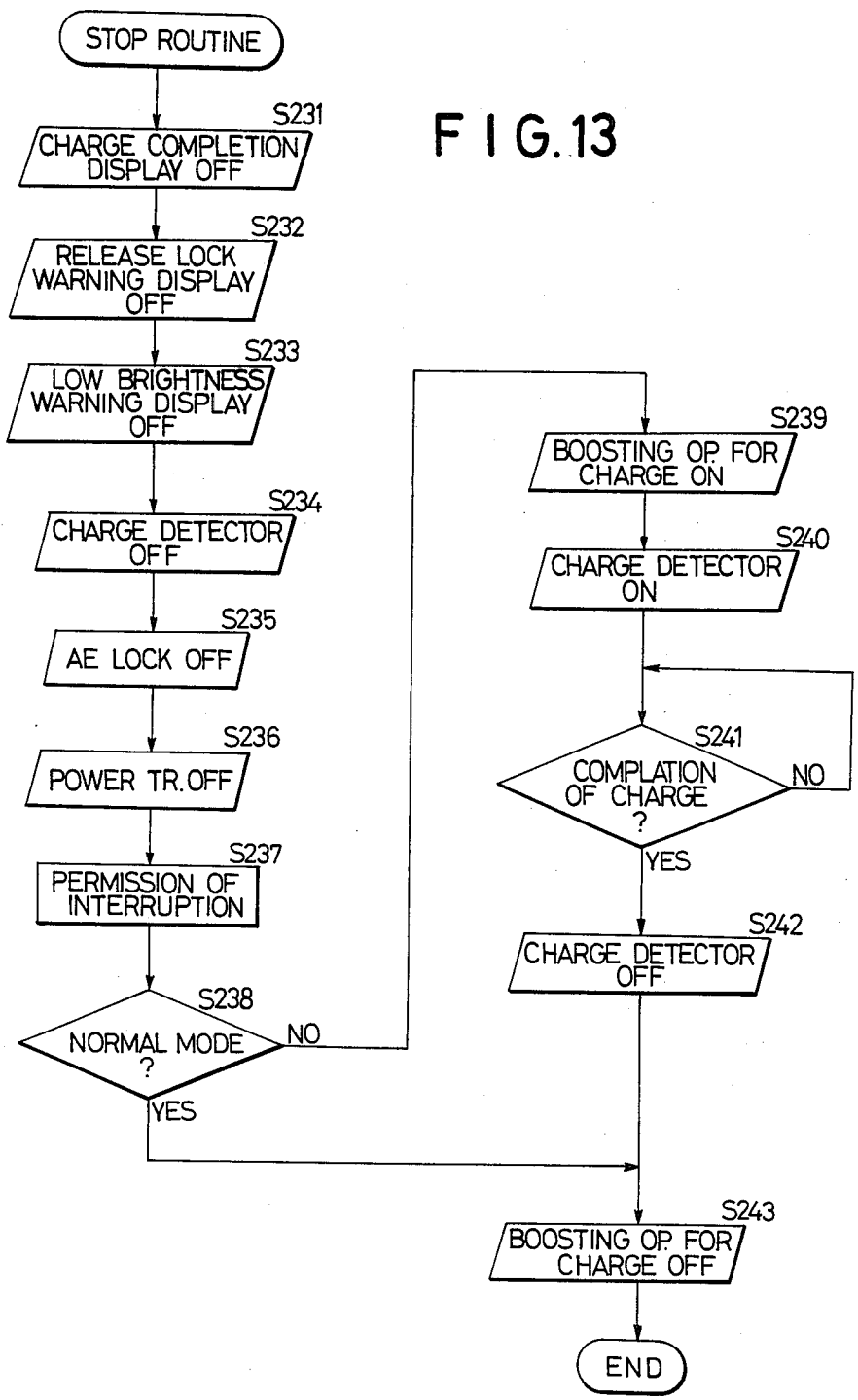

FIG. 13 shows the stop routine. First, the flash charging display element CHD, release lock warning display RLW and shutter low speed warning display UNW are turned OFF, and the charge detector, AE lock and power transistor BT are turned OFF, giving rise to a state which permits interruption (steps S231–S237).

Then, judgment is made as to whether the photographing mode is the real focal length photographing mode or not (step S238). If the answer is negative, that is, when the flash light emitting device is used, charge of the main capacitor in the flash light emitting device is performed for the next photographing and the state of charging is checked. Upon completion of the charging, the detector and the booster are turned OFF to terminate the processing (steps S239–S243). When the photographing mode is the real focal length photographing mode, program shifts to step S243 immediately to turn OFF the booster and terminate the processing.

Figure 14:
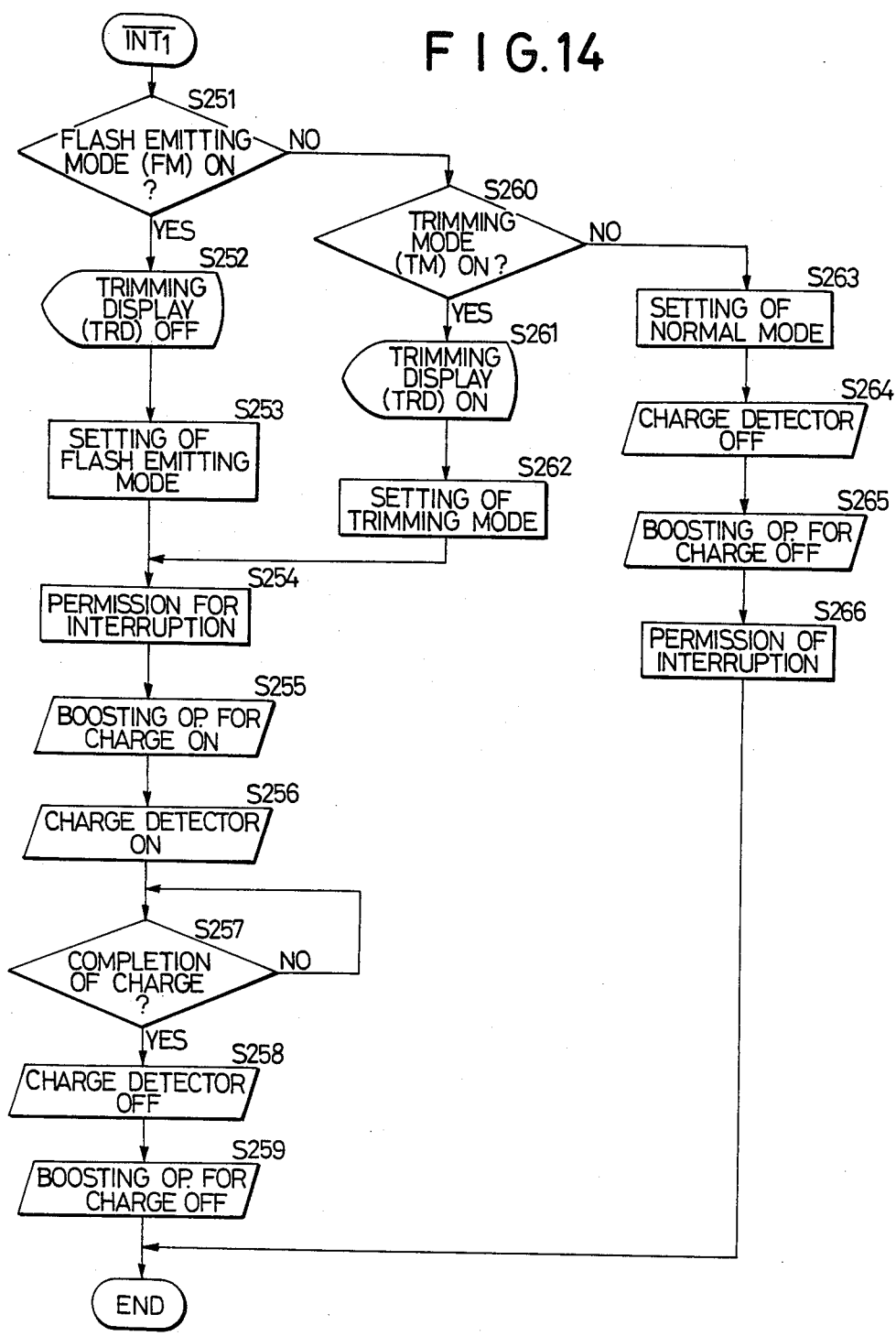

Reference is here made to FIG. 14 to explain an interrupt processing performed when a photographing mode changing interruption signal is fed to an interruption terminal INT$_1$ of the microprocessor MPU.

First, judgment is made as to whether the photographing mode is the flash emitting mode (FM) or not (step S251). If the answer is affirmative, a pseudo focal length photographing mode display TRD is erased and the flash emitting mode is set (steps S252 and S253). Then, after permission of interruption, the booster and the charge detector are turned ON to charge the main capacitor in the flash light emitting device (steps S254 and S255). When a detected charged state shows that the charging is completed, the booster and the detector are turned OFF to terminate the processing (steps S256–S259).

When the photographing mode is not the flash emitting mode, judgment is made as to whether the photographing mode is the pseudo focal length photographing mode or not. If the answer is affirmative, the trimming mode display TRD is lit and the pseudo focal length photographing mode is set (steps S260–S262). Thereafter, program shifts to step S254 to permit interruption and then a series of processings for charging the flash light emitting device are performed like the flash emitting mode.

When the photographing mode is neither the flash emitting mode nor the pseudo focal length photographing mode, this means that it is the real focal length photographing mode, so this mode is set, then the booster for charging the main capacitor in the flash light emitting device and the detector for detecting the completion of charging, and after the permission of interruption, processing is terminated (steps S263–S266).

THIRD EMBODIMENT

In a camera according to the third embodiment, when the film used is a negative film, it is possible to select three kinds of photographing modes which are a real focal length photographing mode (normal mode), a flash emitting mode and a pseudo focal length photographing mode (trimming mode), while when the film used is a positive film, it is possible to select two kinds of photographing modes which are a real focal length photographing mode (normal mode) and a flash emitting mode. The reason why photographing modes are limited to the above two in the case of a positive film is as follows.

In the case where photographing is made in the pseudo focal length photographing mode (trimming mode), it is inevitably premised to use a negative film because it is the object to obtain a trimmed and printed photograph. On the other hand, in the use of a positive film, it is rarely the case that a print is prepared simultaneously with development, and thus the photographing in the pseudo focal length photographing mode (trimming mode) is meaningless. In this case, therefore, only two kinds of photographing modes, one being real focal length photographing mode (normal mode) and the other a flash emitting mode, can be selected.

Figure 15:
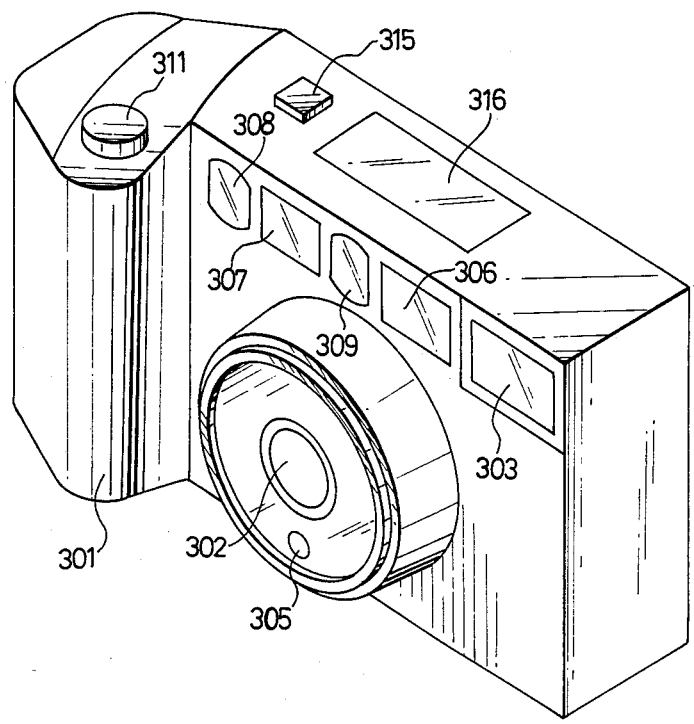

FIG. 15 is a perspective view showing an external appearance of the third embodiment, in which the numeral 301 denotes a camera body; numeral 302 denotes a photographing lens; numeral 303 a flash light emitting device; numeral 305 a light detecting portion of an automatic exposure control device AE; numeral 306 a finder window; numeral 307 a finder illuminating window; numerals 308 and 309 each denote a range finder window; numeral 311 denotes a shutter release button; numeral 315 denotes a photographing mode selection button; and numeral 316 denotes a liquid crystal display panel for the display of various photographing-related data a will be explained later.

Figure 16:
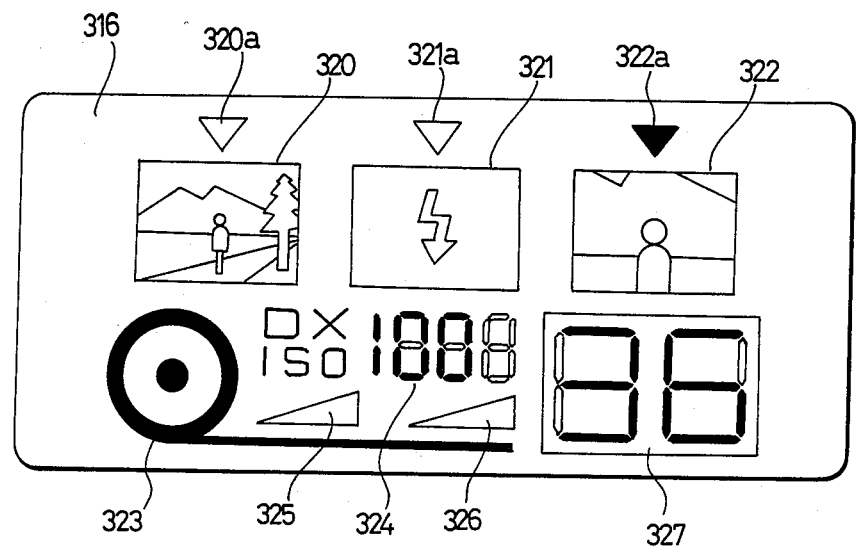
Figure 17:
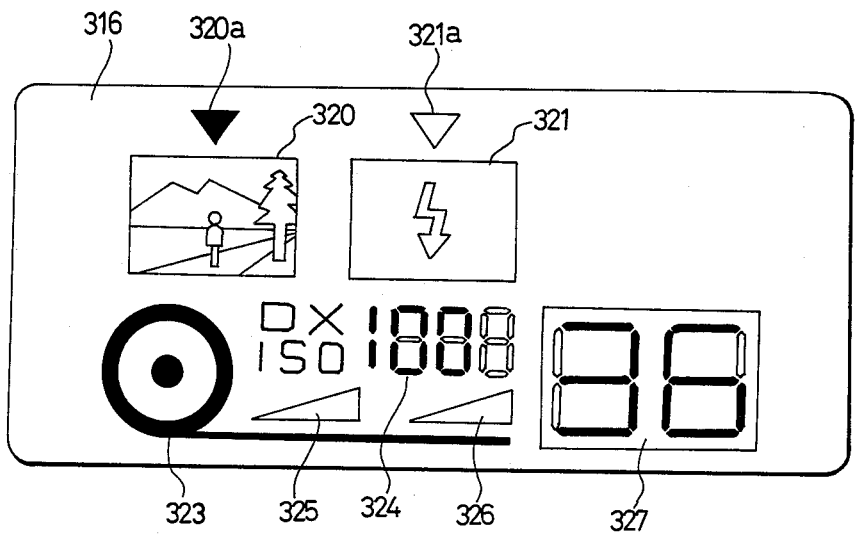

FIGS. 16 and 17 are front views of a liquid crystal display panel 316, FIG. 16 showing the case where a negative film is loaded in the camera, and FIG. 17 showing the case where a positive film is loaded in the camera. As is apparent from FIG. 17, when a positive film is loaded in the camera, selection is made between the real focal length photographing mode and the flash emitting mode, in the absence of the pseudo focal length photographing mode.

Explanation will now be made about display portions. Numeral 316 denotes a liquid crystal display panel, and numerals 320, 321 and 322 denote display portions showing the real focal length photographing mode, flash emitting mode and pseudo focal length photographing mode, respectively. Selections of those are indicated by changing of tone of upper triangular display units 320a, 321a and 322a. Further, numeral 323 denotes a display portion which indicates the loading of film; numeral 324 denotes a film sensitivity display portion; numerals 325 and 326 denote display portions which indicate film rewinding and completion of rewinding (blinking); and numeral 327 denotes a display portion which indicates the number of frames photographed.

At every depression of the photographing mode selection button 315, a repeated change-over is made like real focal length photographing mode (normal mode)→flash emitting mode→pseudo focal length photographing mode (trimming mode)→real focal length photographing mode (normal mode) in the case of a negative film loaded in the camera, while a repeated change-over is made like real focal length photographing mode (normal mode)→flash emitting modes→real focal length photographing mode (normal mode) in the case of a positive film.

Figure 18:
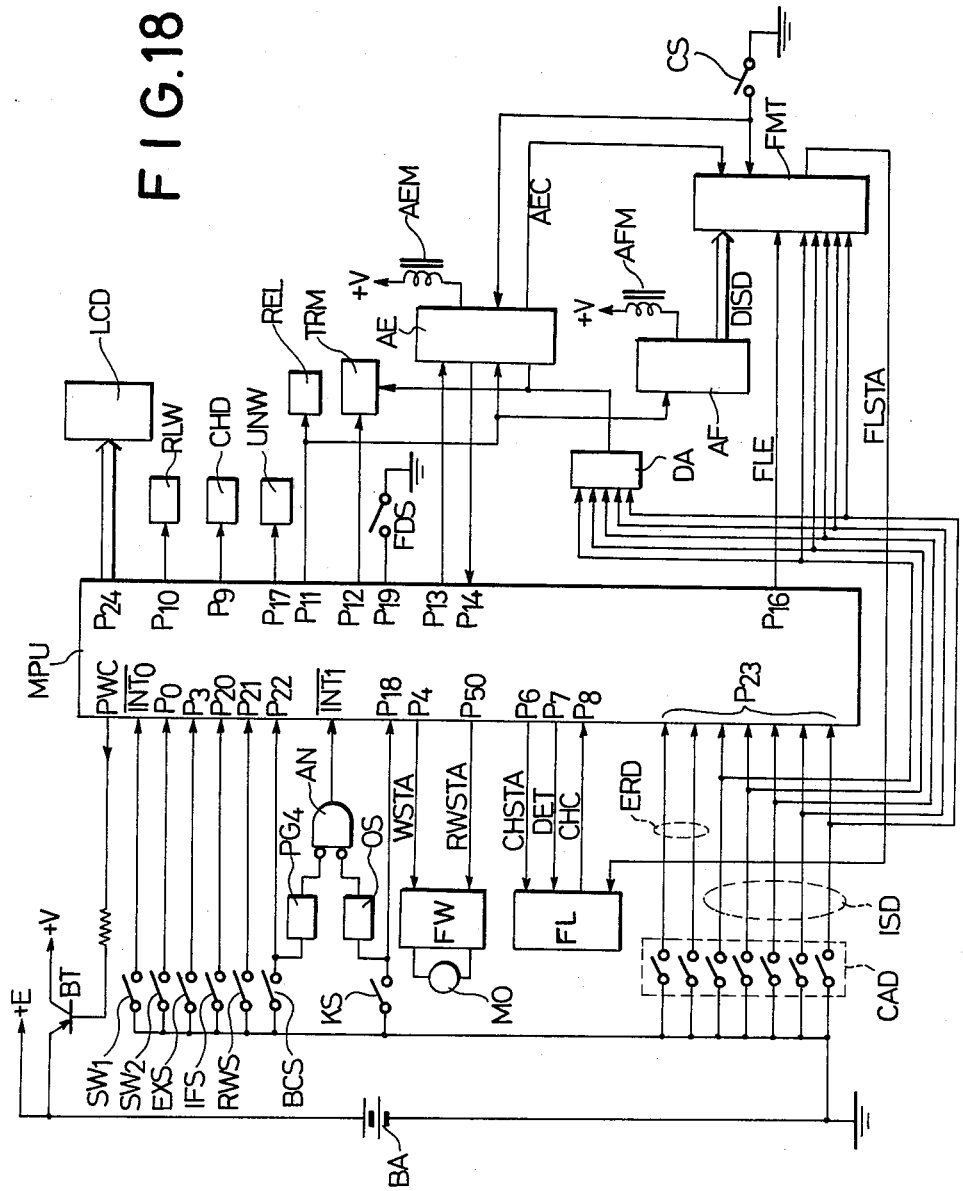

A camera system will now be explained. FIG. 18 is a circuit diagram of the camera system. Electric power supplied from a power battery BA is fed to a microprocessor MPU and so on. Further, from a power transistor BT which is operated by a signal provided from an output port $P_{wc}$ of the microprocessor MPU, electric power is supplied to an automatic exposure control device AE, an automatic focusing device AF, a flashmatic timer FMT and so on.

$SW_1$ denotes a light measuring switch, which is closed by depressing the shutter release button 311 up to a first stage. $SW_2$ denotes a release switch, which is closed by depressing the shutter release button 311 up to a second stage. EXS is not a switch operated externally, but an exposure completion switch which turns ON upon completion of exposure control and OFF upon completion of charging of the automatic exposure control device AE. IFS denotes a one-frame winding switch which turns ON when one frame of the film is wound completely and OFF during winding. RWS denotes an overload detecting switch which turns ON upon application of an overload during winding of a film, for example, when the photographing of all frames of the film is over and the film is at its terminal end and which turns OFF upon rewinding of the film. Output sides of these switches are connected to an interruption terminal $\overline{INT_0}$ and input ports $P_0$, $P_3$, $P_{20}$, $P_{21}$, respectively, of the MPU.

BCS denotes a back lid switch which turns ON upon opening of the back lid of the camera and OFF upon closing thereof. Its output terminal is connected to an input port $P_{22}$ of the MPU. For resetting data stored in the MPU in relation to opening and closing of the back lid, at every opening or closing of the same lid, pulse is provided from the pulse generator $PG_4$ and fed to an interruption terminal $INT_1$ of the MPU through an AND gate to effect an interrupt processing. KS denotes a key switch which turns ON upon depression of the photographing mode selection button 315. An output side thereof is connected an input port $P_{18}$ of the MPU, and pulse is provided from a one-shot pulse generator OS and fed through an AND gate to the interruption terminal $\overline{INT_1}$ of the MPU, and thus an interrupt processing is performed for information processing relating to photographing mode in the MPU at every change-over of photographing mode.

FW denotes a film winding control section, which drives a film winding motor MO in accordance with a winding command signal WSTA provided from an output port $P_4$ of the MPU. Further, upon turning ON of the overload detecting switch RWS, the film is rewound in accordance with a rewinding command signal RWSTA provided from an output port $P_{50}$ of the MPU.

FL denotes a flash light emitting section, whose charging is started in accordance with a charging start command signal CHSTA provided from an output port $P_6$ of the MPU. For checking a charged state, a detector actuation signal DET is provided from an output port $P_7$ of the MPU. Upon completion of the charging, a charge completion signal CHC is provided to an input port $P_8$ of the MPU, which in turn provides a charge completion signal from an output port $P_9$ thereof to light a charge completion display element CHD. In the flash emitting mode, in order to prevent from the shutter release operation before completion of charging of the flash light emitting device, the shutter release operation is locked before the completion of charging in the MP and at the same time a release lock warning signal is provided from an output port $P_{10}$ of the MPU to light a release lock warning display RLW.

CAD denotes a reading portion for CAS code provided on the outside of a film patrone and indicative of film sensitivity and allowable error ranges of exposure. Two upper switches ERD constitute a reading portion for a code indicative of an allowable error range of exposure. A positive film is given an allowable error range of $\pm\frac{1}{2}$ Ev, so if a read signal is $\pm\frac{1}{2}$ Ev, it can be judged that a positive film has been loaded and that in other cases a negative film has been loaded.

Five lower switches ISD constitute a reading portion for a code indicative of a film sensitivity. Whenever a CAS code has been read, any one of the five switches ISD will be sure to turn ON. In this way it is possible to judge whether a CAS code is present or not.

Output signals from the above two switches ERD and the five switches ISD are fed to input ports $P_{23}$ of the MPU. Further, a film sensitivity signal read by a switch ISD is fed through the flashmatic timer FMT and a digital-analog converter DA to the automatic exposure control device AE and a trimming mark printing section TRM, where it is used for determining an amount of exposure according to the film sensitivity.

LCD denotes a liquid crystal display, to which are applied signals for such various indications as previously explained in connection with FIGS. 15 and 16, from output ports $P_{24}$ of the MPU.

FDS denotes a film detecting switch which turns OFF upon loading of a film and ON in the absence of a film. Turning ON thereof during rewinding of a film causes the rewinding operation to stop. Its output is fed to an input port $P_{19}$ of the MPU.

Other circuit constructional portions are common to the first and second embodiments, so will not be explained here.

The following description is now provided about signal processings performed within the microprocessor MPU.

Figure 19B:
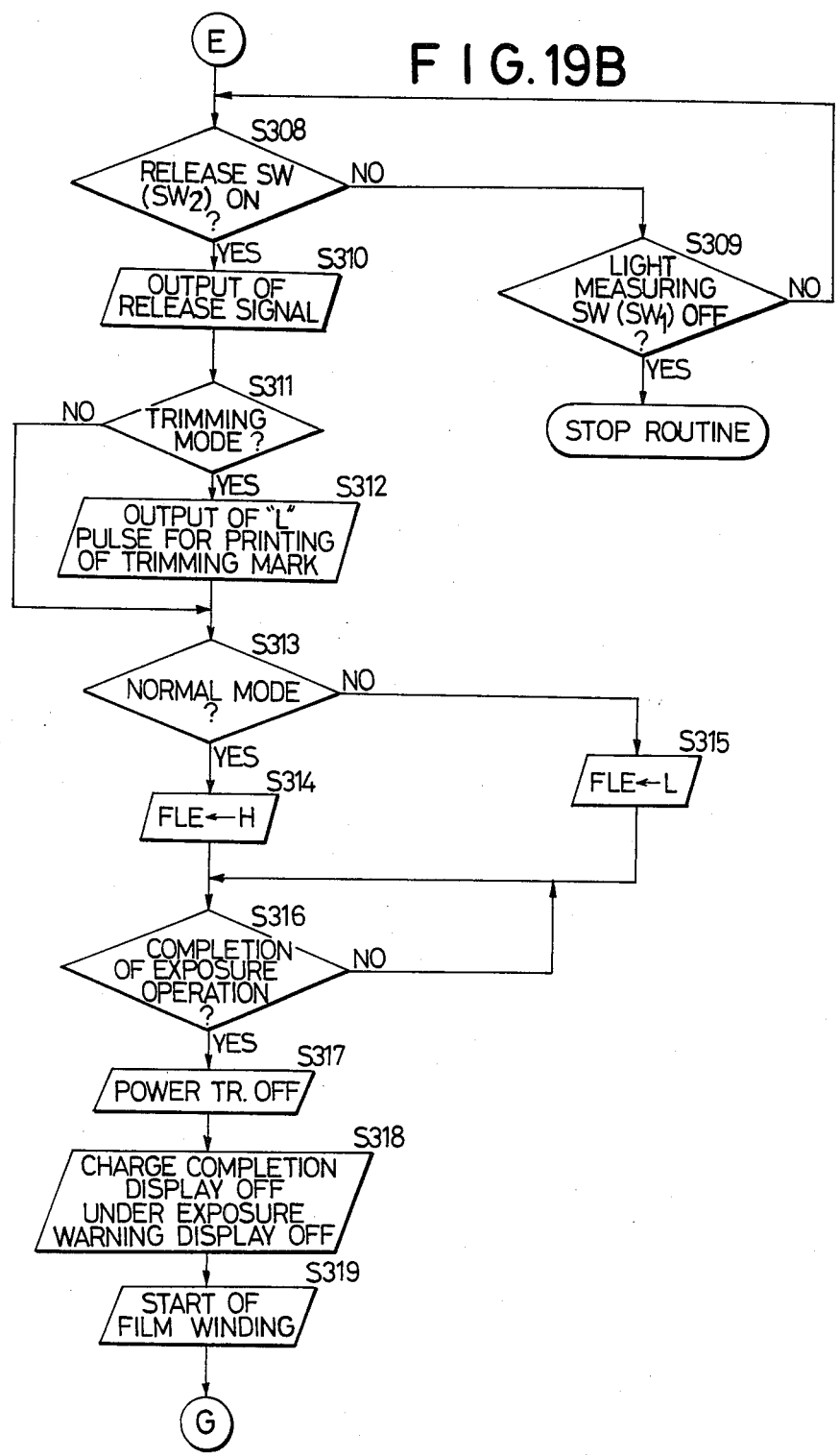

FIG. 19 shows an interrupt processing caused by closing of the light measuring switch $SW_1$ upon depression of the shutter release button 311. Upon arrival of an interruption signal at the terminal $\overline{INT_0}$, the boosting operation for charging the main capacitor of the flash light emitting section FL and the operation for detecting a charged state are stopped (step S301). This is because if the exposure control device AE is operated by an interrupt processing during boosting, there is fear that the exposure control would not be effected correctly because the supply voltage is in a dropped state.

Next, the power transistor BT is turned ON to supply electric power to the automatic exposure control device AE and the automatic focusing device AF (step S302). After waiting for a predetermined time due to the operation of AE and AF, a measured exposure value Ev is memorized and the AE lock is effected (steps S303 and S304).

Judgment is made (step S305) as to whether the photographing mode is the real focal length photographing mode or not. If the answer is affirmative, judgment is made as to whether the shutter speed is below its lower speed limit or not, and if the answer is affirmative, the low brightness warning display UNW is turned ON and a check is made on the release switch $SW_2$ (steps S306, S307 and S308), while if the answer is negative, an immediate check is made on the release switch $SW_2$.

When the photographing mode is not the real focal length photographing mode, program passes to step S328 to turn ON the charge detector in the flash light emitting section FL to check the state of charging (step S329). If the charging is completed, the charge detector is turned OFF and the charge completion display element CHD is turned ON (steps S330 and S331), then the program shifts to step S308 to check the release switch $SW_2$. If the charging has not been completed yet, a shutter release lock condition is created to prevent release operation of the shutter, then the release lock warning display RLW is turned ON and the light measuring switch $SW_1$ turned OFF, whereupon program passes to a stop routine (steps S332 and S333).

Turning again to step S308, a check is made on the release switch $SW_2$, and if it is not ON, judgment is made as to whether the light measuring switch $SW_1$ is OFF or not. If the answer is affirmative, program passes to the stop routine, while if the answer is negative, a check is made again on $SW_2$ (steps S309 and S308).

If the release switch $SW_2$ is ON as a result of the judgment in step S308, a release signal is provided to start the exposure controlling operation (step S310).

Judgment is made (step S311) as to whether the photographing mode is the pseudo focal length photographing mode or not, and if the answer is affirmative, a trimming mark printing "L" pulse is provided to $P_{12}$, while if the answer is negative, this processing is omitted (steps S311 and S312).

Then, the photographing mode is again checked and if it is the real focal length photographing mode, a flashmatic timer actuation command signal FLE is made "H" to render the timer inoperative, while if the photographing mode is not the real focal length photographing mode, the flashmatic timer actuation command signal FLE is made "L" to actuate the flashmatic timer FMT, thereby permitting the emission of flash light (steps S313-S315).

Upon completion of the exposure operation, the power transistor BT is turned OFF to turn OFF the charge completion display element CHD and the low brightness warning display UNW, and one-frame winding of the film is started (steps S316-S319). Then, a check is made as to whether the winding of the film has been completed or not. If the answer is negative, the overload detecting switch is checked, and in the case of an overload condition, that is, when the film is at its terminal end, making it impossible to effect winding, program shifts to a rewind routine (steps S334 and S320).

The winding is stopped upon completion thereof (step S321). Then, a check is made on whether there remains a film portion or not, and if the answer is affirmative, "1" is added to a film counter FCR. A value on the film counter is compared with a predetermined value K (e.g. K=39), and if it is larger than the latter, the value of K is set in the film counter FCR and the contents of the film counter is indicated on the display portion. On the other hand, when there remains no film portion, that is, when the film has been wound completely, "0" is set and if the contents of the film counter is not larger than K, the contents of the film counter is indicated on the display portion (steps S322-S326).

Then, upon turning OFF of the light measuring switch $SW_1$, program passes to the stop routine (step S327).

Figure 20:
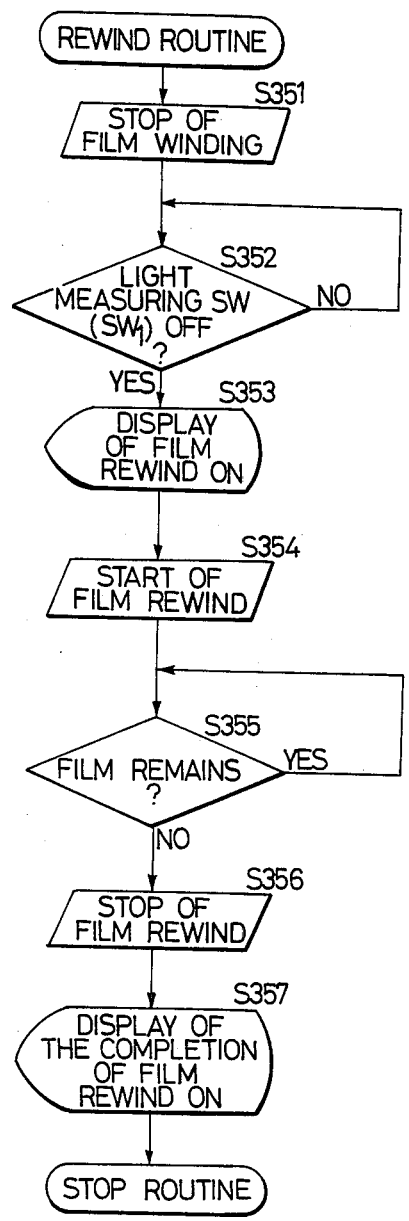

FIG. 20 shows processings of the rewind routine. First, the winding operation is stopped, and upon turning OFF of the light measuring switch $SW_1$, a rewind display is made on the display portion (step S351-S353). Then, rewinding is started and a check is made on whether the film detecting switch FDS is ON or not, and if the answer is affirmative, that is, if there remains no film portion, the rewinding operation is stopped and the completion of rewinding is indicated on the display portion, then the program passes to the stop routine (steps S354-S357).

FIG. 21 shows processings of the stop routine. First, the charge completion display element CHD, the release lock warning display RLW and the low brightness warning display UNW are turned OFF, and further turned OFF are the AE lock and the power supply (steps S361-S365). After the permission of an interrupt processing (step S366), a check is made on whether the photographing mode is the real focal length photographing mode or not (step S367), and if the answer is negative, then for using the flash light emitting device, the charging booster and the charged state detector are turned ON to start charging. Upon completion of the charging, the detector and the booster are turned OFF (steps S367-S372). If photographing mode is real focal length photographing mode, the charging booster is turned OFF immediately and processing is terminated (steps S367, S372).

Figure 22A:
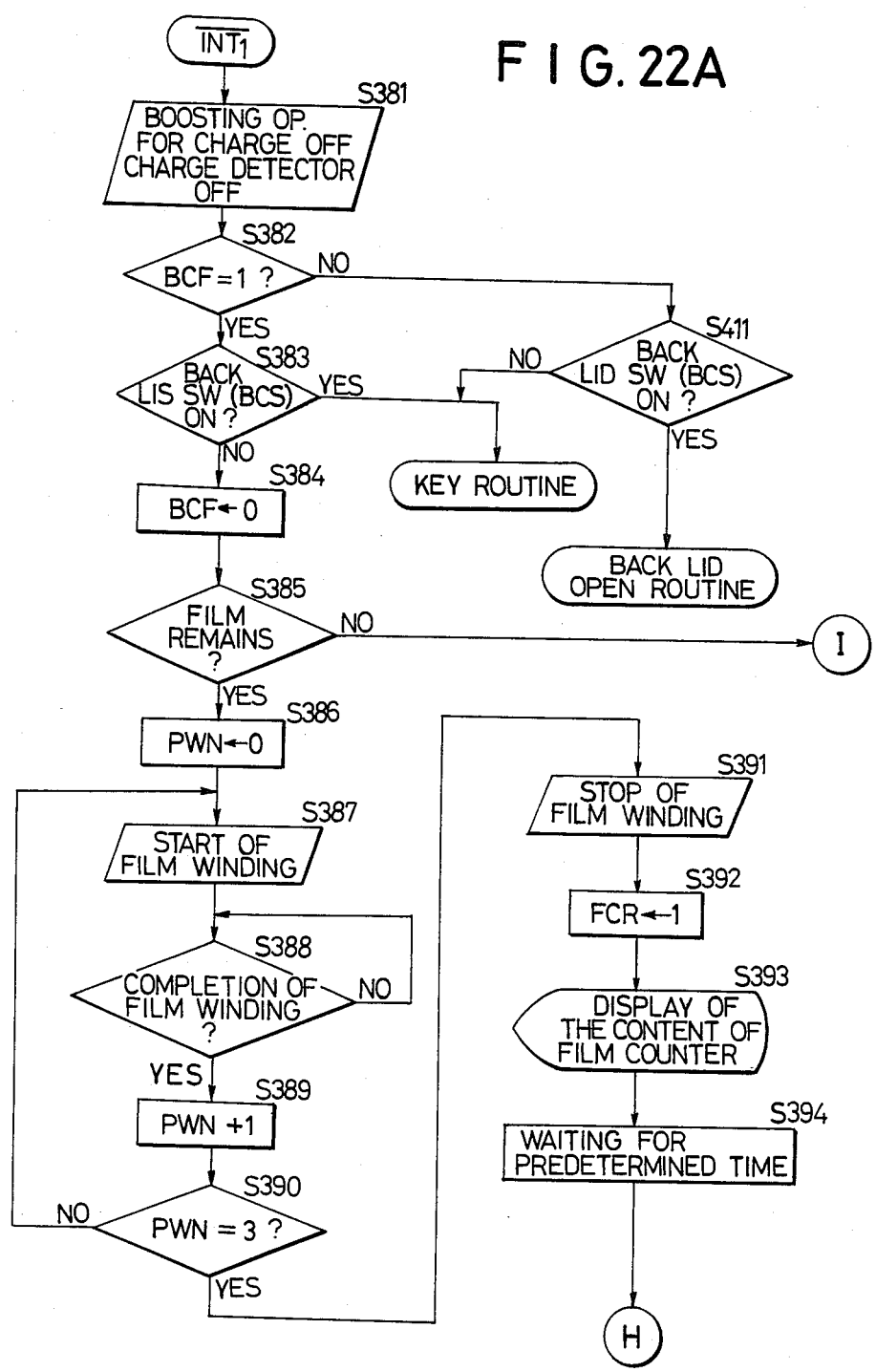
FIGS. 22A and 22B are flowchars of an interruption handling routine based on photographing mode selection.
Figure 22B:
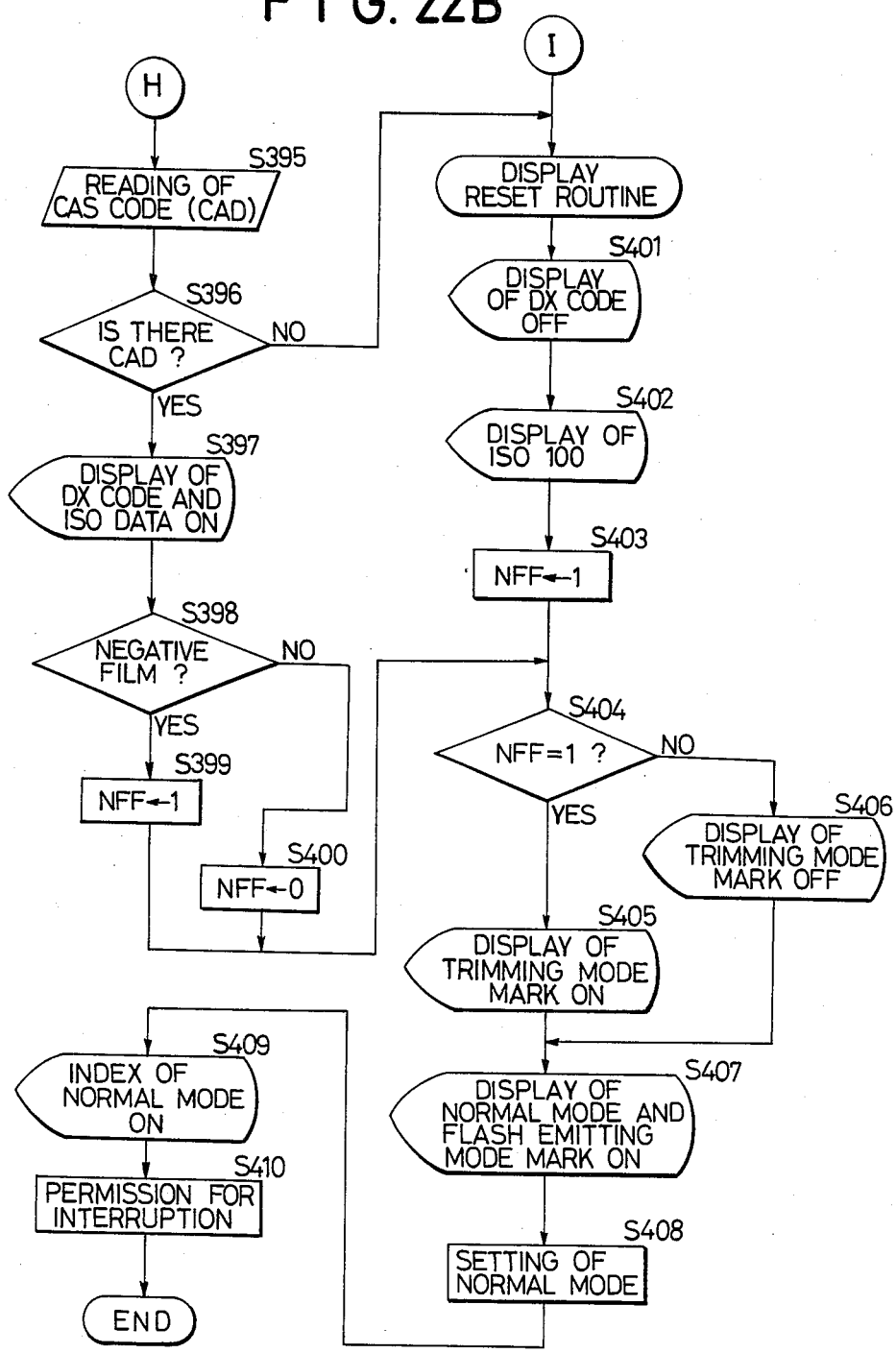

FIG. 22 shows an interruption routine based on opening and closing of the back lid and the change-over selection of photographing mode.

When the back lid switch BCS turns OFF→ON or ON→OFF in response to opening or closing of the back lid of the camera, or when the key switch KS turns ON in response to change-over of photographing mode, an interruption signal is applied to the terminal $\overline{INT_1}$ to start an interrupt processing.

First, the booster for charging the main capacitor in the flash light emitting section FL and the charged state detector are turned OFF (step S381) and a check is made on a back lid open/close flag BCF. This flag is adapted to become "1" upon opening of the back lid and "0" upon closing of the same lid. Therefore, when the back lid switch BCS is OFF (back lid is closed) and flag BCF=1, there is shown an interruption in the change of Open→Close of the back lid, while when the back lid switch BCS is ON (back lid is opened) and flag BCF =0, there is shown an interruption in the change of Close→Open of the back lid.

Further, when the back lid switch BCS is ON and the flag BCF=1, and when the same switch is OFF and the flag BCF=0, there are shown interruptions based on change-over of photographing mode.

Turning back to the flowchart of FIG. 22, if the flag BCF=1, a check is made on the back lid switch BCS (step S383), and if this switch is ON, program shifts to a key routine. If the flag BCF≠1, a check is made on the back lid switch BCS (step S411), and if this switch is ON, program shifts to a back lid open routine, while if it is not ON, program passes to the key routine.

When the back lid switch BCS is not ON as a result of the judgment of step S383, this indicates that the back lid has shifted from open to closed state. In this case, the flag BCF is reset to "0" and a check is made as to whether a film is loaded in the camera or not (steps S384 and S385). If the answer is affirmative, three frames are wound as a preliminary winding until the photographable first frame arrives at the photographing position. A "0" is set in the preliminary winding counter PWN and winding is started. Upon completion of the winding, "1" is added to the counter PWN. This is repeated until PWN=3, whereupon the winding is stopped and "1" is set in the film counter FCR, then the counter contents are indicated on the display portion (steps S386–S393).

After waiting for a predetermined time for stabilization of the film, there is made reading of CAS code on the film patrone (steps S394 and S395). A check is made on whether CAS code CAD is present or not, and if the answer is affirmative, film sensitivity by ISO standard is displayed with "DX" indication on the display portion (steps S396 and S397). Then, whether the film is a negative film or not is judged from the code indicative of an allowable error range of exposure, and if the answer is affirmative, "1" is set to a negative film flag NFF, while if the answer is negative, the NFF is reset to "0" (steps S398–S400). Thereafter, program shifts to step S404 to check the negative film flag NFF.

When there is no film loaded or no CAS code as a result of the judgment in step S396, program passes to display reset routine, in which the "DX" indication on the display portion is turned OFF, which ISO 100 is indicated as a film sensitivity. In this case, moreover, "1" is set to the negative film flag NFF to permit the selection of the pseudo focal length photographing mode (steps S401–S403).

Next, a check is made as to whether the negative film flag NFF is "1" or not, and if the answer is affirmative, the pseudo focal length photographing mode (trimming mode) mark 322 is displayed out of three kinds of photographing mode indication marks (the reference numerals 320, 321 and 322 in FIG. 16). On the other hand, if the negative film flag NFF is not 1", the display of the pseudo focal length photographing mode (trimming mode) mark 322 is erased (steps S405 and S406). Then, the real focal length photographing mode (normal mode) mark 320 and the flash emitting mode mark 321 are displayed (step S407).

Next, the real focal length photographing mode (normal mode) as a basic mode is set and an index (320a in FIG. 16) on the real focal length photographing mode (normal mode) mark 320 out of the photographing mode indication marks is turned ON, and processing is terminated after permission of an interrupt processing (steps S408–S410).

FIG. 23 illustrates the photographing mode changing key routine shown in FIG. 22. In the key routine, first, a check is made as to what previously set photographing mode has so far been set (step S421). If it is the real focal length photographing mode (normal mode), the flash emitting mode is set and a flash emitting mode index 321a as a photographing mode indication index is turned ON, while the previous real focal length photographing mode (normal mode) index 320a is turned OFF (steps S422–S424).

When the photographing mode is not the real focal length photographing mode, program passes to step S425 to check whether the photographing mode is the flash emitting mode or not, and if the answer is affirmative, a check is made as to whether the negative film flag NFF is "1" or not (step S426). If NFF=1, namely, if the loaded film is a negative film, or film is not loaded in the camera, or if the film is not provided with CAS code, the pseudo focal length photographing mode is set because this mode can be set only at this time, and the pseudo focal length photographing mode (trimming mode) index 322a is turned ON, while the previous flash emitting mode index 321a is turned OFF (steps S427–S429). When the negative film flag NFF is not "1", namely, if the film is a positive film, program shifts to step S430 to set the real focal length photographing mode because it is impossible to make setting of the pseudo focal length photographing mode.

When the photographing mode is not the flash emitting mode, either, this means that the photographing mode has so far been the pseudo focal length photographing mode, so the program shifts to step S430 to set the real focal length photographing mode (step S430), and the real focal length photographing mode (normal mode) index 320a is turned ON, while the flash emitting mode index 321a and the pseudo focal length photographing mode (trimming mode) index 322a are turned OFF (steps S431–S433).

Upon completion of the above processing, program returns to the stop routine.

Figure 24:
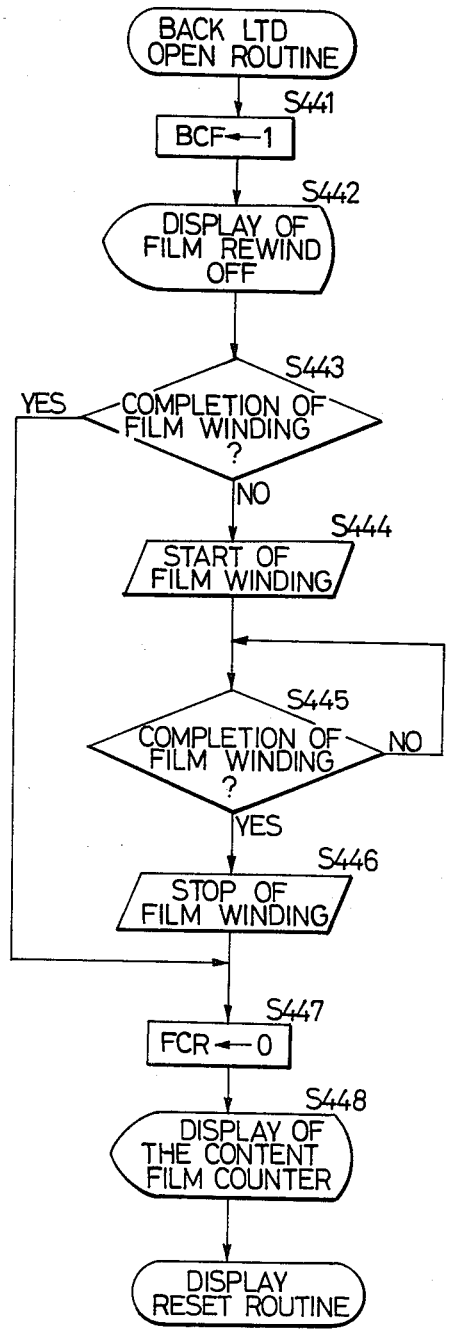

FIG. 24 illustrates the back lid opening routine shown in FIG. 22. This routine is started when the back lid of the camera is opened and the back lid switch BCS is ON. A "1" is set to the back lid open/close flag BCF and the rewind displays 325 and 326 of the display portion is turned OFF (steps S441–S442). Then, a check is made as to whether the winding of the film has been completed or not. If the answer is negative, the film winding is started, and upon completion of the winding, this operation is stopped. Next, the film counter FCR is returned to "0" and the counter contents "0" is indicated on the film counter 327 in the display portion. When the film winding has been completed, the film winding processing is omitted, the film counter FCR is returned to "0", the counter contents is indicated on the display portion, and program shifts to the display reset routine shown in FIG. 22 (steps S443–S448).

In the above embodiments, two or three photographing modes are prepared, but it is possible to provide four photographing modes such as real focal length photographing mode, pseudo focal length photographing mode, real focal length photographing mode with flash emitting and pseudo focal length photographing mode with flash emitting, and when selecting pseudo focal length photographing mode with flash emitting, expand the distance between the optical axis of the objective lens and flash emitting device compared with the said distance in real focal length photographing mode with flash emitting.

Further, it is possible to make judge the negative film or positive film by checking the switch which is selected by users manually and indicates the kind of loaded film, instead of the automatic setting of the kind of film by reading of DX code on the film cartridge.

Furthermore, it is possible to construct camera in which the selection of photographing mode is performed by manual operation of a mode selecting lever and the kind of loaded film is set by manual operation of another film selecting lever, and in which both levers are interlocked with each other so that the mode selecting lever can not be shifted to a position selecting the pseudo focal length photographing mode if the film selecting lever is set to a position corresponding to a positive film, whereby the pseudo focal length photographing mode can not be selected when the positive film is set.

Additionally, it is possible to inhibit the shutter release operation and to indicate the warning of shutter release lock condition when the pseudo focal length photographing condition is selected in the case where the positive film is loaded. In this case, it is possible to detect such state in response to the closure of light measuring switch $SW_1$ and to immediately changeover the photographing mode to the real focal length photographing mode or the flash light emitting mode prior to the closure of the release switch $SW_2$.

What is claimed is:

1. A photographic camera comprising:
    means for selecting a real focal length photographing mode in which a normal range in a frame of a film will be printed on a photographic paper and a pseudo focal length photographing mode in which a range narrower than the normal range in a frame of the film will be printed on a photographic paper;
    means for measuring an amount of light coming from an object to be photographed to produce a light measuring signal indicative of the measured amount of light;
    means responsive to said light measuring signal for discriminating whether the measured amount of light is under a predetermined amount to produce a discriminating signal indicative of the discriminated result;
    means responsive to said discriminating signal for producing a flash emission signal during an exposure control operation, only when the measured amount is discriminated to be under the predetermined amount, in the condition the real focal length photographing mode is selected, and for producing a flash emission signal during an exposure control operation independently of the discriminating signal, in the condition the pseudo focal length photographing mode is selected; and
    means for emitting a flash of light in response to the flash emission signal.

2. A photographic camera as claimed in claim 1, further comprising means for recording on said photographic film an information signal which indicates that the pseudo focal length photographing mode is selected when the pseudo focal length photographing mode is selected by said mode selecting means.

3. A photographic camera as claimed in claim 2, wherein the mode selecting means further includes means for selecting a flash emitting mode in which the flash emitting means forcibly emits the flash of light independently of the discriminating signal, and wherein the flash emission signal producing means produces the flash emission signal during an exposure control operation independently of the discriminating signal in the condition the flash emitting mode is selected, and wherein the photographic camera further comprises means for stopping the operation of the information recording means when the flash emitting mode is selected.

4. A photographic camera as claimed in claim 1, further comprising means for controlling a distance from an optical axis of an objective lens to a light emitting portion of the flash emitting means so that the distance when the pseudo focal length photographing mode is selected, is extended in comparison with the distance when the real focal length photographing mode is selected.

* * * * *